(12) United States Patent
Kompalli et al.

(10) Patent No.: US 10,872,532 B2
(45) Date of Patent: Dec. 22, 2020

(54) CALIBRATION OF FIXED IMAGE-CAPTURING DEVICE FOR PREDICTING DRIVING LANE

(71) Applicant: ANI TECHNOLOGIES PRIVATE LIMITED, Bengaluru (IN)

(72) Inventors: Pramod Sankar Kompalli, Bengaluru (IN); Sathya Narayanan Nagarajan, Bengaluru (IN); Apurv Nigam, Unnao (IN); Srikanth Vidapanakal, Bengaluru (IN)

(73) Assignee: ANI TECHNOLOGIES PRIVATE LIMITED, Bengaluru (IN)

( * ) Notice: Subject to any disclaimer, the term of this patent is extended or adjusted under 35 U.S.C. 154(b) by 0 days.

(21) Appl. No.: 16/433,620

(22) Filed: Jun. 6, 2019

(65) Prior Publication Data
US 2020/0273342 A1 Aug. 27, 2020

(51) Int. Cl.
| | |
|---|---|
| *G06T 7/80* | (2017.01) |
| *G08G 1/16* | (2006.01) |
| *G06K 9/00* | (2006.01) |
| *G06T 7/13* | (2017.01) |
| *G06T 7/60* | (2017.01) |
| *G06K 9/36* | (2006.01) |
| *B60R 1/00* | (2006.01) |

(52) U.S. Cl.
CPC ......... *G08G 1/167* (2013.01); *G06K 9/00798* (2013.01); *G06K 9/00805* (2013.01); *G06K 9/36* (2013.01); *G06T 7/13* (2017.01); *G06T 7/60* (2013.01); *G06T 7/80* (2017.01); *B60R 1/00* (2013.01); *B60R 2300/804* (2013.01); *G06T 2207/30256* (2013.01)

(58) Field of Classification Search
CPC .. G08G 1/167; G06T 7/80; G06T 7/13; G06T 7/60; G06K 9/00798; G06K 9/00805; G06K 9/36
See application file for complete search history.

(56) References Cited

U.S. PATENT DOCUMENTS

| | | | |
|---|---|---|---|
| 2010/0245575 A1* | 9/2010 | Mori | G06K 9/00798 348/148 |
| 2011/0202240 A1 | 8/2011 | Bosch | |
| 2013/0046441 A1 | 2/2013 | Marczok et al. | |

(Continued)

OTHER PUBLICATIONS

R. Hartley and A. Zisserman, Multiple View Geometry in Computer Vision, Cambridge University Press, New York, NY, USA, 2 edition, 2003.

(Continued)

*Primary Examiner* — Jonathan R Messmore
(74) *Attorney, Agent, or Firm* — Chip Law Group

(57) ABSTRACT

Lane prediction for driving assistance is provided. A camera of a vehicle is calibrated to obtain column values for each row of pixels of an image based on a plurality of lines captured in the image. The plurality of lines may be either parallel or perpendicular to a calibration lane captured in the image. The column values of each row of pixels may be utilized to predict a driving lane for the vehicle. When an on-road object is detected in the predicted driving lane, a warning message for an impending collision may be generated and communicated to a driver of the vehicle, thereby facilitating driving assistance to the driver in real-time.

20 Claims, 16 Drawing Sheets

(56) References Cited

U.S. PATENT DOCUMENTS

2015/0279017 A1* 10/2015 Tamura ................ H04N 13/239
382/103
2019/0103026 A1* 4/2019 Liu ...................... G06K 9/3233

OTHER PUBLICATIONS

A. G. Howard, M. Zhu, B. Chen, D. Kalenichenko, W. Wang, T. Weyand, M. Andreetto, and H. Adam, Mobilenets: E_cient convolutional neural networks for mobile vision applications, Google Inc.
W. Liu, D. Anguelov, D. Erhan, C. Szegedy, S. E. Reed, C. Fu, and A. C. Berg, SSD: single shot multibox detector, In ECCV, vol. 9905 of Lecture Notes in Computer Science, pp. 21-37, Springer, 2016.

* cited by examiner

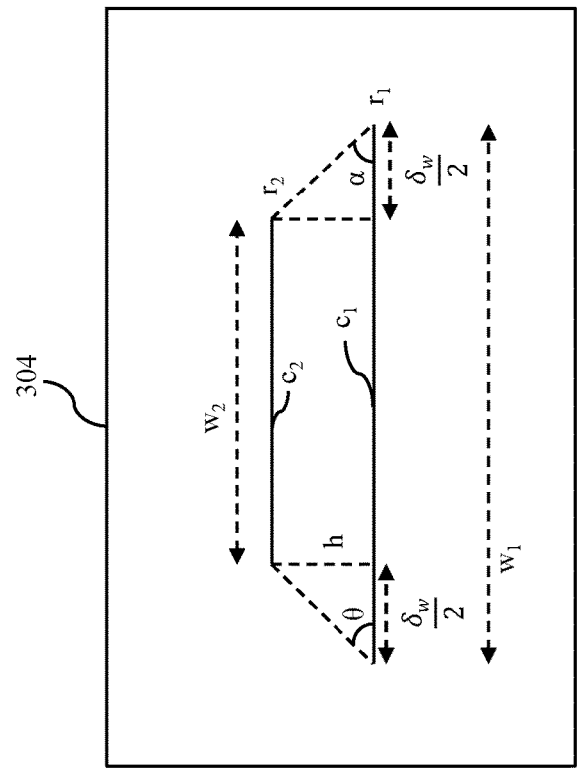
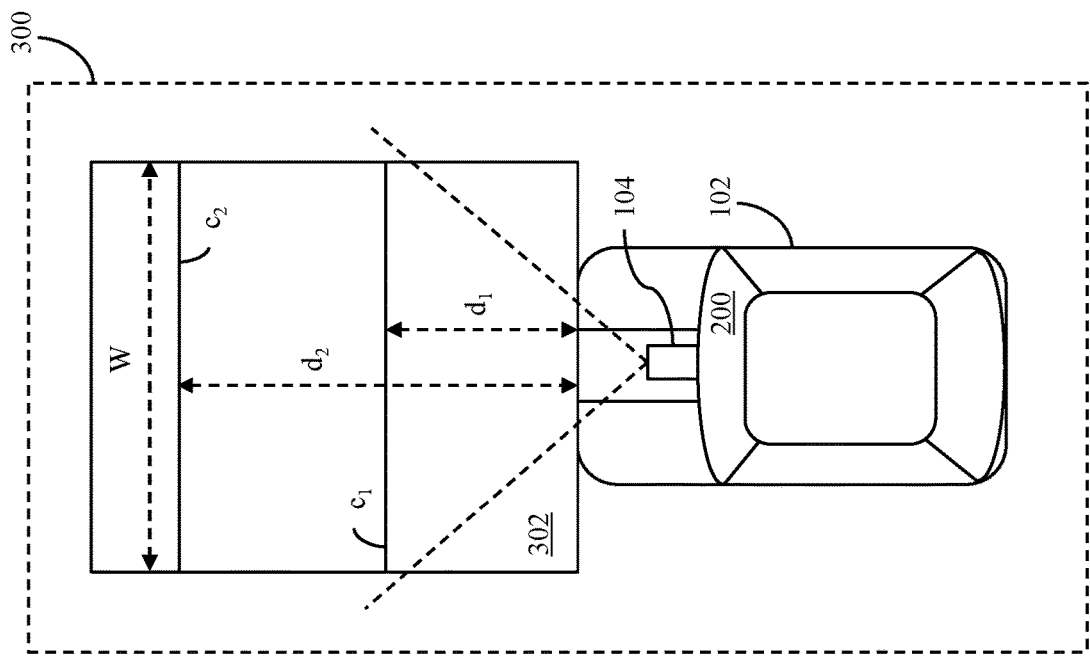
FIG. 3B
FIG. 3A

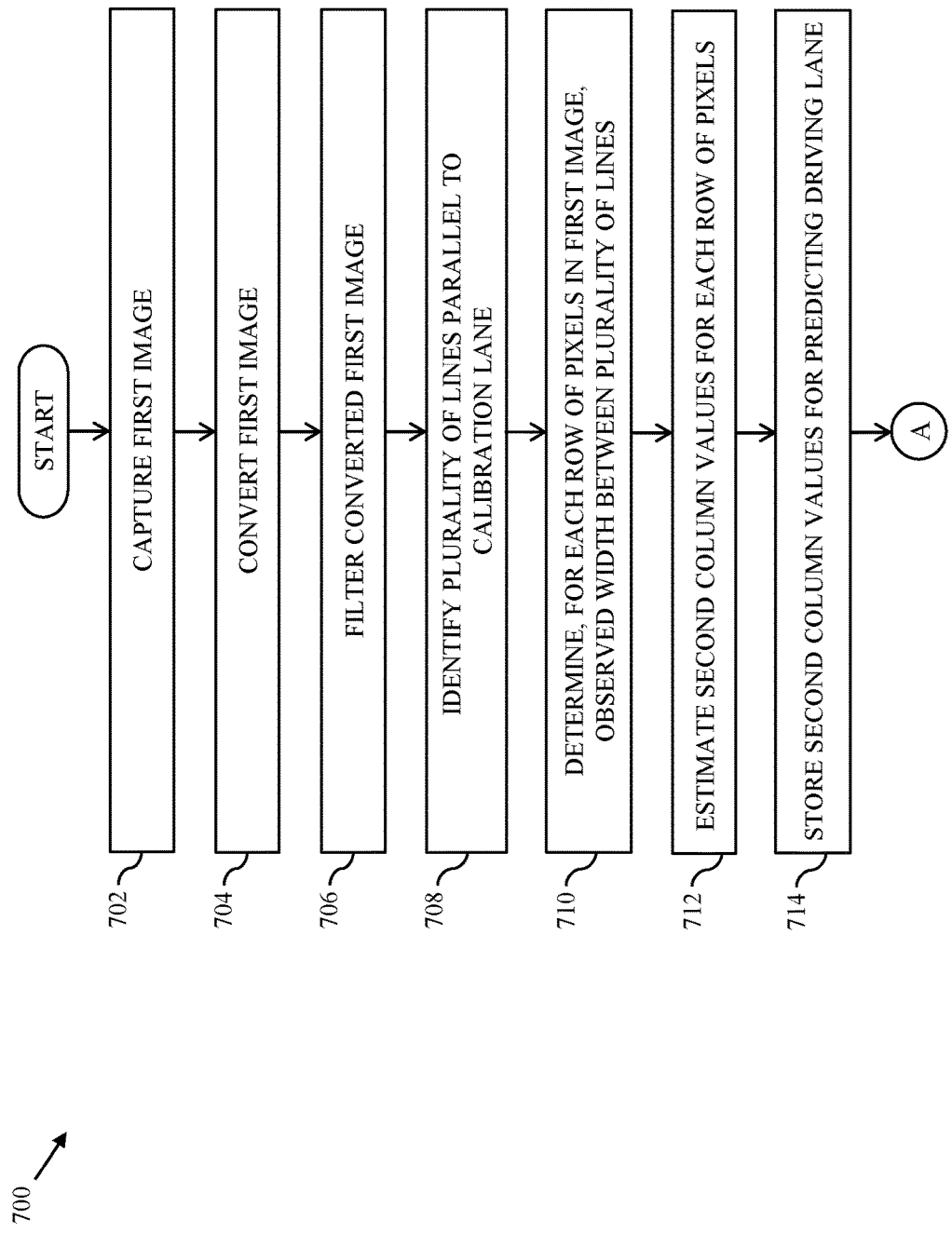

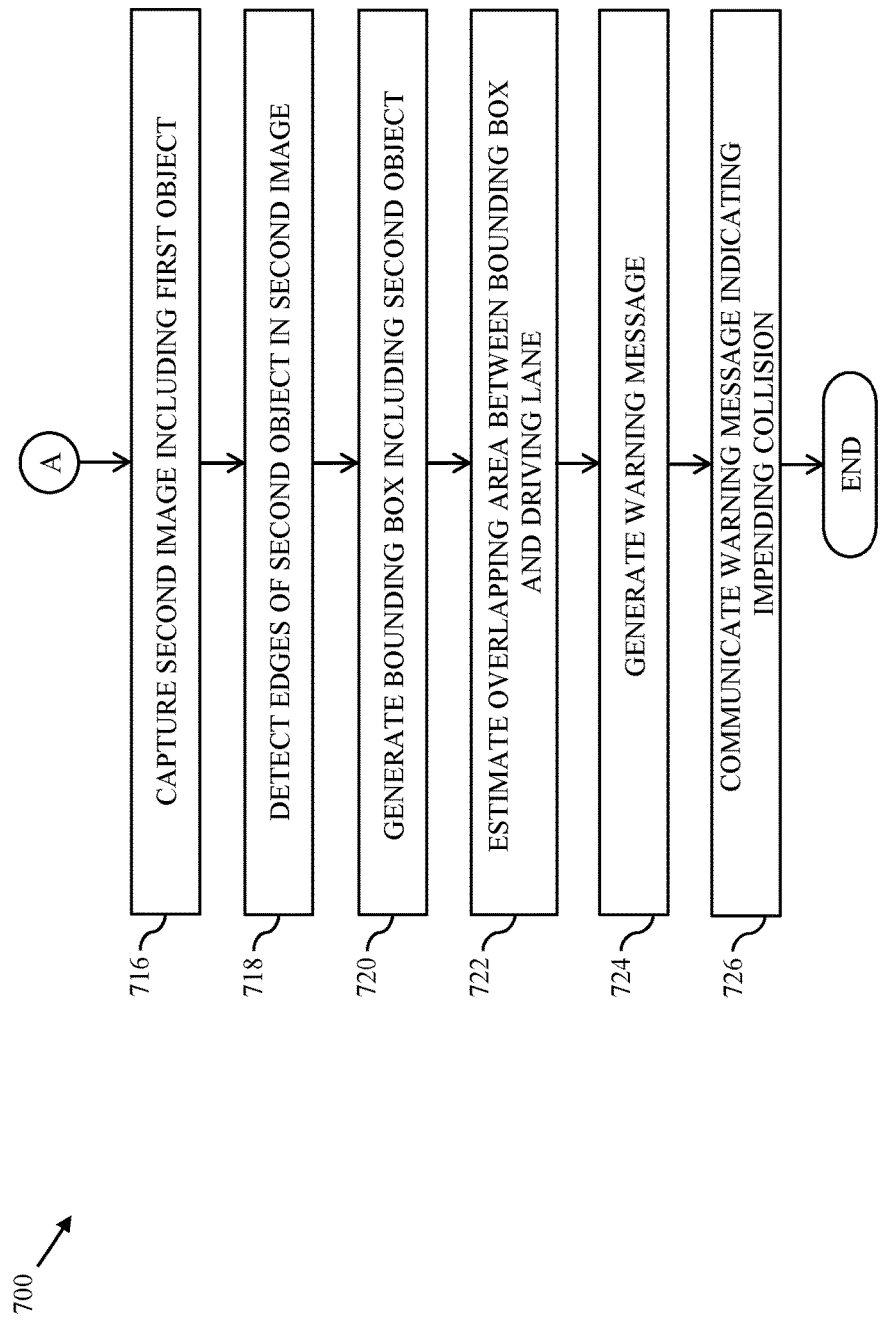

CALIBRATION OF FIXED IMAGE-CAPTURING DEVICE FOR PREDICTING DRIVING LANE

CROSS-RELATED APPLICATIONS

This application claims priority of Indian Application Serial No. 201941007775, filed Feb. 27, 2019, the contents of which are incorporated herein by reference.

FIELD

Various embodiments of the disclosure relate generally to driving assistance systems. More specifically, various embodiments of the disclosure relate to calibration of a fixed image-capturing device for predicting a driving lane.

BACKGROUND

Advancements in the field of automobiles along with continuously increasing demand for personal and commercial vehicles have vastly increased the number of vehicles that are plying along various roads on a daily basis, thus increasing the traffic density. The increased traffic density of traffic on the roads has resulted in a rapid rise in the number of collisions of the vehicles with stationary or moving objects. Thus, driving a vehicle is becoming a complex procedure, especially along roads with the dense traffic. While driving through the dense traffic, a driver of the vehicle can encounter critical situations that the driver is unable to solve quickly and thus can cause accident. To avoid such accidents, it is imperative that the driver be aware of the critical situations well in advance.

Further, in developing or undeveloped regions, most of the roads are not lane-marked, nor do vehicles follow the so-called lane discipline, where only one vehicle can occupy an entire lane. This behavior has the advantage of being extremely efficient by maximizing the utilization of the road infrastructure. However, this means that the advanced driver-assistance systems (ADAS) built with other assumptions of lane-discipline may not be usable in the developing or non-developed regions. Such solutions typically alert the driver whenever there is an obstacle in the current lane of the vehicle, which would result in dis-proportionally large number of alerts for the current traffic conditions. They also need to continuously detect lanes and estimate lane-departure status at every step during run-time, which adds computational burden on the ADAS.

In light of the foregoing, there exists a need for a technical and reliable solution that overcomes the above-mentioned problems, challenges, and short-comings, and manages lane prediction for facilitating driving assistance to drivers of vehicles in a manner that may offer reliable and enhanced experiences to the drivers.

SUMMARY

Calibration of a fixed image-capturing device for predicting a driving lane is provided substantially as shown in, and described in connection with, at least one of the figures, as set forth more completely in the claims.

These and other features and advantages of the disclosure may be appreciated from a review of the following detailed description of the disclosure, along with the accompanying figures in which like reference numerals refer to like parts throughout.

BRIEF DESCRIPTION OF THE DRAWINGS

FIG. 3A is a diagram that illustrates a calibration system for calibrating an image-capturing device of the vehicle, in accordance with an exemplary embodiment of the disclosure;

FIG. 3B is a diagram that illustrates a first image captured by the image-capturing device, in accordance with an exemplary embodiment of the disclosure;

FIGS. 7A and 7B, collectively, illustrate a flow chart of a method for calibrating the fixed image-capturing device of the vehicle for predicting the driving lane, in accordance with another exemplary embodiment of the disclosure;

DETAILED DESCRIPTION

Figure 1:
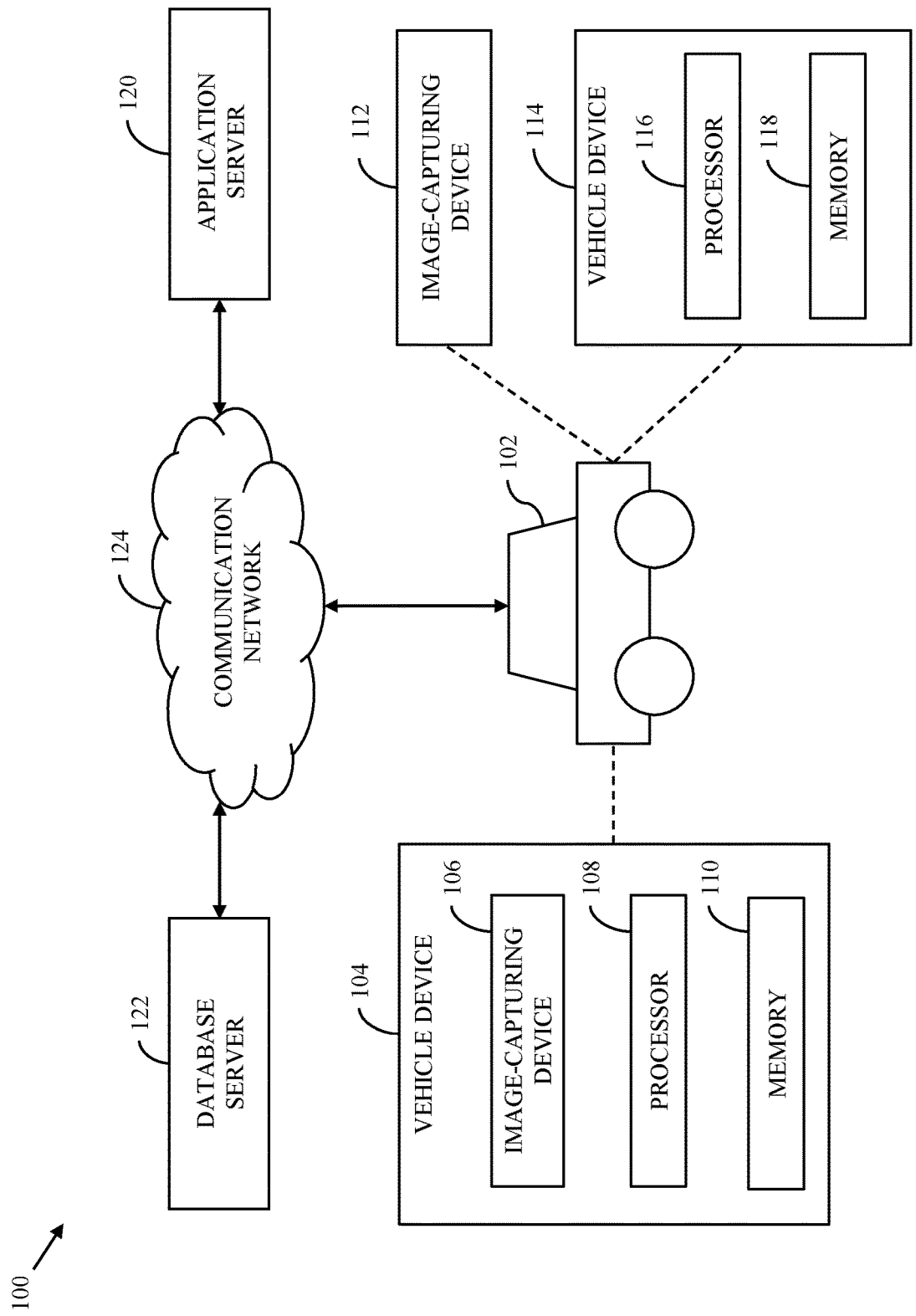
FIG. 1 is a block diagram that illustrates an environment for calibration of fixed image-capturing devices of vehicles for driving lane prediction, in accordance with an exemplary embodiment of the disclosure.

Certain embodiments of the disclosure may be found in a disclosed apparatus for calibration of a fixed image-capturing device of a vehicle for predicting a driving lane. Exemplary aspects of the disclosure provide a method and a system for calibrating the fixed image-capturing device of the vehicle, predicting the driving lane for the vehicle, and predicting a distance of an object in the predicted driving lane from the vehicle. The method includes one or more operations that are executed by circuitry of the disclosed apparatus to perform calibration of the fixed image-capturing device. The circuitry may be configured to identify a plurality of lines from a first image. The first image may be captured by the image-capturing device fixed on a first object such as a vehicle. The first image may include a calibration lane of the first object, and the plurality of lines. In one example, the plurality of lines may be perpendicular to the calibration lane of the first object. In another example, the plurality of lines may be parallel to the calibration lane of the first object. The circuitry may be further configured to determine a first width of each of a plurality of rows of pixels in the first image based on at least one of the plurality of lines. The circuitry may be further configured to estimate column values for each of the plurality of rows of pixels in the first image. The column values may be estimated based on at least the first width of a corresponding row of pixels. The circuitry may be further configured to store the estimated column values for each row of pixels in a memory. Further, the driving lane for the first object may be predicted in real-time based on the stored column values. Further, a second image, captured by the same image-capturing device or a different image-capturing device fixed on the first object, may be analyzed to detect a second object in the second image for impending collision with the first object. The second object in the second image may be analyzed based on detection of the second object in the driving lane of the first object. Upon detection of the second object in the driving lane of the first object, the circuitry may be further configured to generate a warning message based on at least the distance of the second object from the first object and a relative speed between the first object and the second object. The circuitry may be further configured to communicate the warning message to an entity associated with the first object. The warning message may indicate the possibility of the impending collision of the first object with the second object.

Another exemplary aspect of the disclosure provides a method and a system for calibrating a fixed image-capturing device of a vehicle, predicting a driving lane for the vehicle, and predicting a distance of an object in the predicted driving lane from the vehicle. The method includes one or more operations that are executed by circuitry of the system to identify a first plurality of rows of pixels corresponding to a plurality of lines in a first image captured by an image-capturing device that is fixed on a first object such as a vehicle. The first image may include the plurality of lines on a calibration lane of the first object. The plurality of lines may be perpendicular to the calibration lane. The circuitry may be further configured to analyze the first image to determine a first width of a first line corresponding to a first row of pixels of the first plurality of rows of pixels. The circuitry may be further configured to analyze the first image to determine a second width of a second line corresponding to a second row of pixels of a second plurality of rows of pixels in the first image. The second width of the second line may be determined based on at least the first width and an angle between the first line and the second line. The angle may be determined by joining endpoints (of the same sides) of the first line and the second line. The circuitry may be further configured to estimate column values for each line corresponding to each row of pixels in the first image. The column values may be estimated based on at least one of the first width or the second width associated with a corresponding line or row of pixels. The circuitry may be further configured to store the estimated column values for each line or row of pixels in a memory. Further, the driving lane for the first object may be predicted in real-time based on the stored column values. Further, a second image, captured by the same image-capturing device or a different image-capturing device fixed on the first object, may be analyzed to detect a second object in the second image for impending collision with the first object. The second object in the second image may be analyzed based on detection of the second object in the driving lane of the first object. Upon detection of the second object in the driving lane of the first object, the circuitry may be further configured to generate a warning message based on at least the distance of the second object from the first object and a relative speed between the first object and the second object. The circuitry may be further configured to communicate the warning message to an entity associated with the first object. The warning message may indicate the possibility of the impending collision of the first object with the second object.

Another exemplary aspect of the disclosure provides a method and a system for calibrating a fixed image-capturing device of a vehicle, predicting a driving lane for the vehicle, and predicting a distance of an object in the predicted driving lane from the vehicle. The method includes one or more operations that are executed by circuitry of the system to identify a plurality of lines in a first image captured by an image-capturing device that is fixed on a first object such as a vehicle. The first image may include a calibration lane of the first object and the plurality of lines that are parallel to the calibration lane. The circuitry may be further configured to analyze the first image to determine an observed width between the plurality of lines. The observed width may be determined for each row of pixels in the first image. The circuitry may be further configured to estimate column values for each row of pixels in the first image. The column values may be estimated based on the observed width of a corresponding row of pixels, a first object width of the first object, and an actual lane width between the plurality of lines. The circuitry may be further configured to store the estimated column values for each line or row of pixels in a memory. Further, the driving lane for the first object may be predicted in real-time based on the stored column values. Further, a second image, captured by the same image-capturing device or a different image-capturing device fixed on the first object, may be analyzed to detect a second object in the second image for impending collision with the first object. The second object in the second image may be analyzed based on detection of the second object in the driving lane of the first object. Upon detection of the second object in the driving lane of the first object, the circuitry may be further configured to generate a warning message based on at least the distance of the second object from the first object and a relative speed between the first object and the second object. The circuitry may be further configured to communicate the warning message to an entity associated with the first object. The warning message may indicate the possibility of the impending collision of the first object with the second object.

Thus, various methods and systems of the disclosure facilitate calibration of a fixed image-capturing device of a vehicle to obtain column values that are further utilized in real-time to predict a driving lane for the vehicle. Further, based on at least detection of a first object in the driving lane and a distance of the first object from the vehicle, a possibility of impending collision of the vehicle with the first object may be predicted and accordingly a warning message may be generated and communicated to a driver of the vehicle for preventing the possible impending collision. Thus, the implementation of the methods and systems of the disclosure may assist the driver during an ongoing trip to avoid accidents based on the detection of various on-road obstacles, such as other vehicles, pedestrians, animals, or the like.

FIG. 1 is a block diagram that illustrates an environment 100 for calibration of fixed image-capturing devices of vehicles for driving lane prediction, in accordance with an exemplary embodiment of the disclosure. The environment 100 includes a vehicle 102, a vehicle device 104 including an image-capturing device 106, a processor 108, and a memory 110, an image-capturing device 112, a vehicle device 114 including a processor 116 and a memory 118, an application server 120, and a database server 122 that communicate with each other via a communication network 124.

In an embodiment, the vehicle 102 may include a lane prediction mechanism. The lane prediction mechanism may facilitate prediction of a driving lane for the vehicle 102 in real-time i.e., when a driver of the vehicle 102 is driving the vehicle 102. Further, based on detection of a first object in the driving lane of the vehicle 102, a first distance of the first object from the vehicle 102 may be predicted. Examples of the first object may include, but are not limited to, a pedestrian, an animal, a vehicle, a road-divider, a non-drivable area, a rock, a road sign, a building, and a tree. For facilitating prediction of the driving lane in the real-time, the lane prediction mechanism may be calibrated. Thus, the vehicle 102 may be subjected to a calibration phase (in which the lane prediction mechanism may be calibrated to obtain calibration data) and an implementation phase (in which the lane prediction mechanism may predict the driving lane based on the calibration data). In an embodiment, the lane prediction mechanism may be realized or implemented by the vehicle device 104 including the image-capturing device 106, the processor 108, and the memory 110. In another embodiment, the lane prediction mechanism may be realized or implemented by a combination of the image-capturing device 112 and the vehicle device 114 including the processor 116 and the memory 118. Here, the image-capturing device 112 and the vehicle device 114 are separate devices installed in the vehicle 102. In another embodiment, the lane prediction mechanism may be realized or implemented by a combination of the image-capturing device 106 or 112, the application server 120, and the database server 122.

The vehicle 102 is a mode of transportation that is used by a user to commute from one location to another location. In an embodiment, the vehicle 102 may be owned by the user. In another embodiment, the vehicle 102 may be owned by a vehicle service provider for offering on-demand vehicle or ride services to one or more passengers (e.g., the user). The vehicle 102 may include one or more vehicle devices such as the vehicle device 104 or the vehicle device 114. Examples of the vehicle 102 may include, but are not limited to, an automobile, a bus, a car, an auto-rickshaw, and a bike.

The vehicle device 104 may include suitable logic, circuitry, interfaces, and/or code, executable by the circuitry, that may be configured to perform one or more operations. The vehicle device 104 may be a computing device that is installed inside the vehicle 102. Examples of the vehicle device 104 may include, but are not limited to, a mobile phone, a tablet, a laptop, a vehicle head unit, or any other portable communication device that is placed inside the vehicle 102. The vehicle device 104 may be realized through various web-based technologies such as, but are not limited to, a Java web-framework, a .NET framework, a PHP (Hypertext Preprocessor) framework, or any other web-application framework. The vehicle device 104 may be further realized through various embedded technologies such as, but are not limited to, microcontrollers or microprocessors that are operating on one or more operating systems such as Windows, Android, Unix, Ubuntu, Mac OS, or the like.

In an embodiment, the vehicle device 104 may be installed on a front windshield (shown in FIGS. 2A and 3A) of the vehicle 102. Further, the vehicle device 104 may be installed such that the image-capturing device 106 is positioned at a center of the front windshield and may be oriented to face outside the vehicle 102 for capturing various on-road objects present in front of the vehicle 102 such as the first object in the driving lane of the vehicle 102. In another embodiment, the vehicle device 104 may be installed behind the front windshield of the vehicle 102. Further, the vehicle device 104 may be installed such that the image-capturing device 106 is positioned at a center of the front windshield and may be oriented to face outside the vehicle 102 for capturing the various on-road objects such as the first object. In another embodiment, the vehicle device 104 may be installed on a rear windshield (not shown) of the vehicle 102. Further, the vehicle device 104 may be installed such that the image-capturing device 106 is positioned at a center of the rear windshield and may be oriented to face outside the vehicle 102 for capturing the various on-road objects present behind the vehicle 102.

In an embodiment, the vehicle device 104 may be calibrated in the calibration phase. Based on the calibration, the vehicle device 104 may be configured to predict the driving lane for the vehicle 102 in the implementation phase. The vehicle device 104 may be configured to execute the calibration phase and the implementation phase by utilizing the image-capturing device 106, the processor 108, and the memory 110. The image-capturing device 106, the processor 108, and the memory 110 may communicate with each other via a first communication bus (not shown).

The image-capturing device 106 may include suitable logic, circuitry, interfaces, and/or code, executable by the circuitry, that may be configured to perform one or more operations. For example, the image-capturing device 106 may be an optical instrument that includes one or more image sensors for recording or capturing a set of images. The set of images may be individual still photographs or a sequence of images constituting a video. In an embodiment, the image-capturing device 106 may be a red, green, and blue (RGB) camera. Thus, the set of images (captured by the image-capturing device 106) may be associated with an RGB color model. However, a person of ordinary skill in the art would understand that the scope of the disclosure is not limited to this specific scenario in which the image-capturing device 106 may be configured to capture the set of images associated with the RGB color model. In various other embodiments, the set of images captured by the image-capturing device 106 may be associated with a different color model such as a black and white color model, a greyscale color model, a hue, saturation, and value (HSV) color model, a cyan, magenta, yellow, and black (CMYK) color model, a hue, saturation, and brightness (HSB) color model, a hue, saturation, and lightness (HSL) color model, a hue, chroma, and value (HCV) color model, or the like.

Figure 3C:
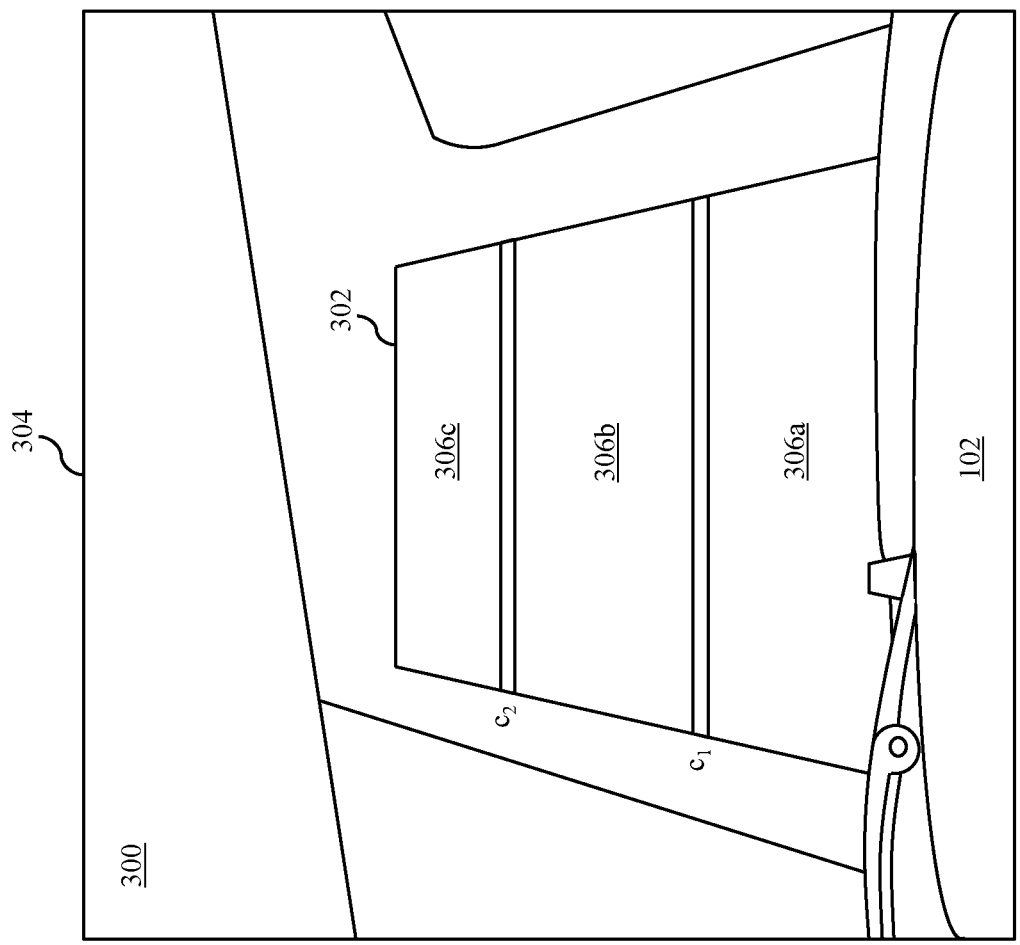
FIGS. 3C-3E are diagrams that collectively illustrate identification of one or more rows of pixels in the first image of FIG. 3B corresponding to one or more calibration lines of FIG. 3A, respectively, in accordance with an exemplary embodiment of the disclosure.
Figures 4A, 4B:
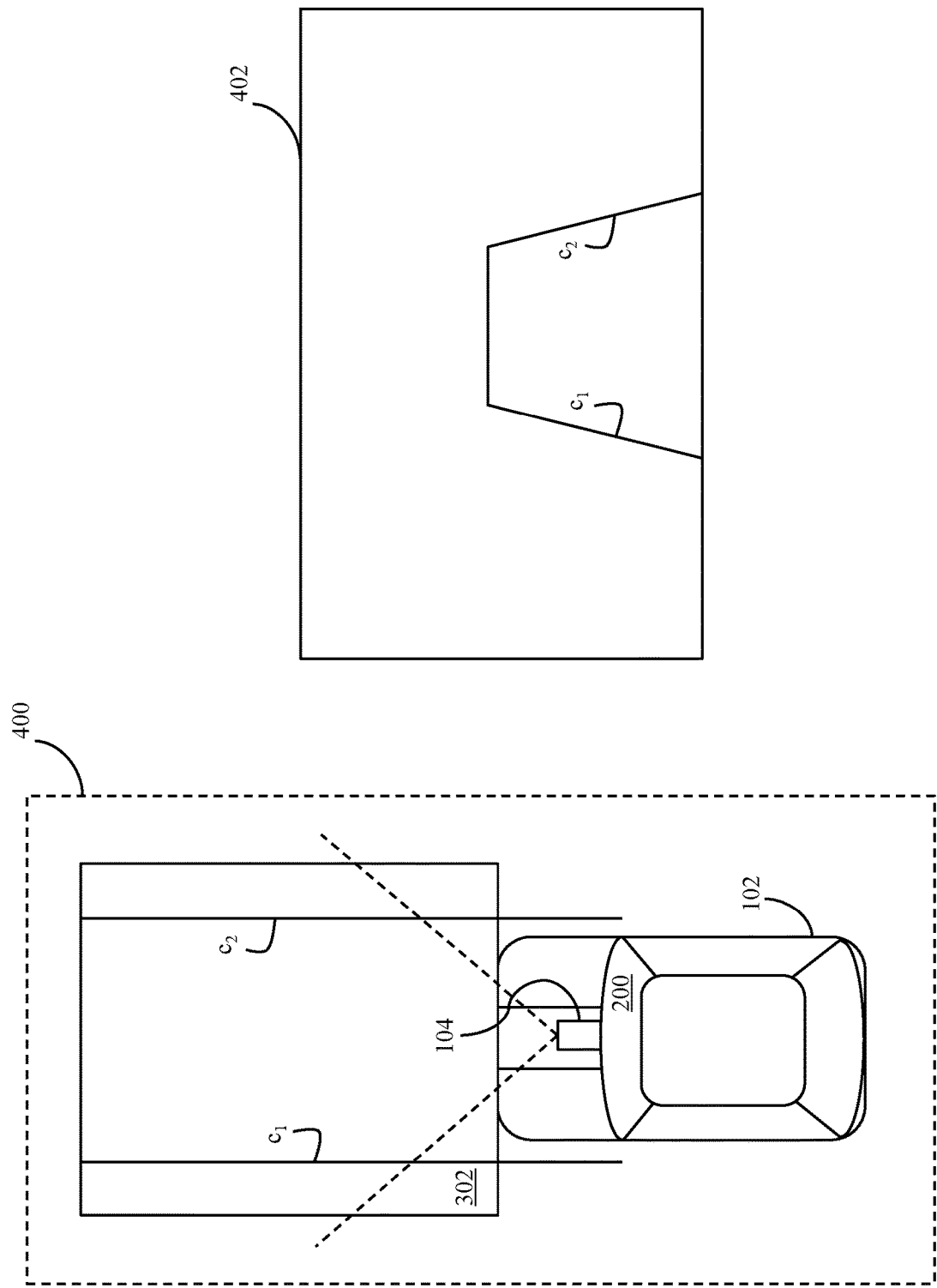
FIG. 4A is a diagram that illustrates a calibration system for calibrating the image-capturing device, in accordance with another exemplary embodiment of the disclosure.
FIG. 4B is a diagram that illustrates a first image captured by the image-capturing device, in accordance with another exemplary embodiment of the disclosure.

In an embodiment, in the calibration phase, the image-capturing device 106 may be configured to capture a first image (shown in FIGS. 3B and 3C, or FIG. 4B) of a calibration system or environment (shown in FIG. 3A or 4A). In one example, the image-capturing device 106 may automatically capture the first image. In another example, the image-capturing device 106 may capture the first image based on an input triggered by an individual such as an administrator who is monitoring and managing the calibration phase.

In an embodiment, the calibration system or environment (hereinafter, "the calibration system") may include the vehicle 102, a carpet (i.e., a calibration lane shown in FIGS. 3A and 3C, or FIG. 4A), and/or first and second calibration lines (shown in FIGS. 3A, 3B, and 3C, or FIG. 4A) painted on the carpet. In one example, the first and second calibration lines may be perpendicular to a path (i.e., the calibration lane) of the vehicle 102. In another example, the first and second calibration lines may be parallel to a path (i.e., the calibration lane) of the vehicle 102. In another embodiment, the calibration system may include the vehicle 102 and third and fourth calibration lines (not shown) drawn on a ground plane (not shown), and the third and fourth calibration lines may be perpendicular or parallel to the path of the vehicle 102. In another embodiment, the calibration system may include the vehicle 102 and first and second colored tapes (not shown) pasted on the ground plane, and the first and second colored tapes may be perpendicular or parallel to the path of the vehicle 102. In another embodiment, the calibration system may include the vehicle 102 and an enclosed space (not shown) with first and second rows of lights (not shown). The first and second rows of lights may be perpendicular or parallel to the path of the vehicle 102.

In case of perpendicular calibration lines, the first and second calibration lines, the third and fourth calibration lines, the first and second colored tapes, and the first and second rows of lights may be at known distances from the vehicle 102 (or the image-capturing device 106 of the vehicle 102) and may be associated with known widths (i.e., actual widths). In case of parallel calibration lines, the first and second calibration lines, the third and fourth calibration lines, the first and second colored tapes, and the first and second rows of lights may be at a known width (i.e., an actual lane width) from each other such that the known width is equal to (or greater than) a width of the calibration lane.

For the sake of ongoing description, it is assumed that the calibration system includes the carpet laid in front of the vehicle 102 with the first and second calibration lines painted on the carpet. It will be apparent to a person of ordinary skill in the art that the scope of the disclosure is not limited to the realization of the calibration phase by using only two calibration lines (such as the first and second calibration lines, the third and fourth calibration lines, the first and second colored tapes, or the first and second rows of lights). In various other embodiments, the calibration phase may be realized by using more than two calibration lines. Thus, the first image of the calibration system may include at least the carpet along with the first and second calibration lines painted on the carpet. Upon capturing the first image of the calibration system, the image-capturing device 106 may be configured to transmit the first image (e.g., image data associated with the first image) to the processor 108, store the first image in the memory 110, transmit the first image to the application server 120, or transmit the first image to the database server 122.

In an embodiment, in the implementation phase, the image-capturing device 106 may be configured to capture a second image of a road (or a route segment) along which the vehicle 102 is currently traversing. Upon capturing the second image, the image-capturing device 106 may be configured to transmit the second image (e.g., image data associated with the second image) to the processor 108, store the second image in the memory 110, transmit the second image to the application server 120, or transmit the second image to the database server 122. The second image may include at least one or more on-road objects (such as the first object) or a portion of the one or more on-road objects that are present in a capturing range of the image-capturing device 106. In some embodiments, the second image may include various other objects apart from the first object. Examples of such on-road objects may include, but are not limited to, one or more pedestrians, animals, other vehicles, road-dividers, non-drivable areas, rocks, road signs, buildings, and trees.

The processor 108 may include suitable logic, circuitry, interfaces, and/or code, executable by the circuitry, that may be configured to perform one or more operations. Examples of the processor 108 may include, but are not limited to, an application-specific integrated circuit (ASIC) processor, a reduced instruction set computing (RISC) processor, a complex instruction set computing (CISC) processor, and a field-programmable gate array (FPGA). It will be apparent to a person of ordinary skill in the art that the processor 108 may be compatible with multiple operating systems.

In an embodiment, the one or more operations may be associated with the calibration phase and the implementation phase. In an embodiment, in the calibration phase, the processor 108 may be configured to receive the first image from the image-capturing device 106, or retrieve the first image from the memory 110 or the database server 122. The processor 108 may be further configured to process the first image to identify a plurality of lines such as the first and second calibration lines shown in FIGS. 3A, 3B, and 3C. Thereafter, the processor 108 may be configured to determine an orientation of the first and second calibration lines with respect to the calibration lane captured in the first image. In a scenario where the first and second calibration lines are perpendicular to the calibration lane, the processor 108 may be configured to identify first and second rows of pixels (shown in FIG. 3B) in the first image. The first and second rows of pixels (i.e., a first plurality of rows of pixels) may correspond to the first and second calibration lines, respectively.

In an embodiment, the processor 108 may be further configured to determine a first width (i.e., an observed width) of the first calibration line corresponding to the first row of pixels of the first plurality of rows of pixels. The first width of the first calibration line may be determined from the first image. Similarly, the processor 108 may determine a second width (i.e., an observed width) of the second calibration line corresponding to the second row of pixels of the first plurality of rows of pixels. The processor 108 may be further configured to determine a third width of a third line corresponding to a third row of pixels of remaining rows of pixels (i.e., a second plurality of rows of pixels) in the first image. The third width of the third line may be determined based on at least the first or second width and a first angle between the first or second calibration line and a fourth line joining the first or second calibration line with the third line. In one example, the first angle may be obtained by joining the same endpoints of the first calibration line and the third line using the fourth line. In another example, the first angle may be obtained by joining the same endpoints of the second calibration line and the third line using the fourth line. In exemplary embodiment, the first width, the second width, or the third width may be determined in terms of number of column pixels of the first image.

The processor 108 may be further configured to estimate first column values for each line corresponding to each row of pixels (i.e., the first and second plurality of rows of pixels)

in the first image based on at least a corresponding width. For example, the first column values for the first calibration line, the second calibration line, or the third line may be determined based on the first width, the second width, or the third width, respectively. Similarly, the first column values for each remaining line (or each remaining row of pixels) may be determined. The processor 108 may be further configured to store the first column values of each line corresponding to each row of pixels of the first image in the memory 110. In another embodiment, the processor 108 may store the first column values in the database server 122.

In another scenario where the first and second calibration lines are determined to be parallel to the calibration lane, the processor 108 may be configured to determine a fourth width (i.e., an observed width) between the first and second calibration lines. The fourth width between the first and second calibration lines may be determined for each line corresponding to each row of pixels of the first image as observed from the first image. Further, for each line corresponding to each row of pixels, the processor 108 may be configured to estimate second column values. The second column values corresponding to each row of pixels may be estimated based on the fourth width of the corresponding row of pixels, a first vehicle width of the vehicle 102, and the actual lane width between the first and second calibration lines. The processor 108 may be further configured to store the second column values corresponding to each row of pixels in the memory 110. In another embodiment, the processor 108 may store the second column values in the database server 122.

In an embodiment, in the implementation phase, the processor 108 may be configured to retrieve column values (such as the first or second column values) from the memory 110 or the database server 122. The processor 108 may be further configured to predict the driving lane for the vehicle 102 in the real-time based on the retrieved column values. The processor 108 may render the driving lane (predicted for the vehicle 102) on a display (not shown) of the vehicle device 104, or some other display integrated inside the vehicle 102.

Further, in an embodiment, the processor 108 may be configured to receive the second image from the image-capturing device 106, or retrieve the second image from the memory 110 or the database server 122. The processor 108 may be further configured to process the second image to detect the one or more on-road objects (such as the first object) captured in the second image. Further, the processor 108 may be configured to analyze the first object in the second image for impending collision with the vehicle 102 based on detection of the first object in the driving lane of the vehicle 102. When the first object is detected in the driving lane of the vehicle 102 and the first distance of the first object from the vehicle 102 is less than a threshold distance value, the processor 108 may be configured to generate a warning message and communicate the warning message to the driver of the vehicle 102 to provide driving assistance in the real-time. For example, the generated warning message may read as "Hey driver! There is an obstacle at 5 m in your driving lane. The chances of collision with the obstacle is high if you drive at the current speed. Go slow!!". The warning message may be communicated to the driver by communicating an audio message, a video message, a haptic message, or the like.

The memory 110 may include suitable logic, circuitry, interfaces, and/or code, executable by the circuitry, that may be configured to store one or more instructions that are executed by the image-capturing device 106 or the processor 108 to perform their operations. The memory 110 may be configured to store the first image, the second image, and the column values such as the first or second column values. The memory 110 may be further configured to store the threshold distance value, the first vehicle width, the first width, the second width, the third width, the fourth width, and the actual lane width. Examples of the memory 110 may include, but are not limited to, a random-access memory (RAM), a read-only memory (ROM), a programmable ROM (PROM), and an erasable PROM (EPROM).

The image-capturing device 112 may include suitable logic, circuitry, interfaces, and/or code, executable by the circuitry, that may be configured to perform one or more operations. For example, the image-capturing device 112 may be an optical instrument that includes one or more image sensors for recording or capturing a set of images. The set of images may be individual still photographs or a sequence of images constituting a video. In an embodiment, the image-capturing device 112 may be installed on the front windshield of the vehicle 102 such that the image-capturing device 112 is positioned at a center of the front windshield and may be oriented to face outside the vehicle 102 for capturing the various on-road objects (such as the first object) present in the front as well as in the driving lane of the vehicle 102. In another embodiment, the image-capturing device 112 may be installed behind the front windshield such that the image-capturing device 112 is positioned at a center of the front windshield and may be oriented to face outside the vehicle 102 for capturing the various on-road objects present in the front as well as in the driving lane of the vehicle 102. In another embodiment, the image-capturing device 112 may be installed on the rear windshield of the vehicle 102 such that the image-capturing device 112 is positioned at a center of the rear windshield and may be oriented to face outside the vehicle 102 for capturing the various on-road objects present behind the vehicle 102 and in line with the driving lane of the vehicle 102. The image-capturing device 112 may be connected or coupled to the vehicle device 114 via the communication network 124 or a second communication bus (not shown). Further, the image-capturing device 112 may be connected or coupled to the application server 120 or the database server 122 via the communication network 124.

In an embodiment, in the calibration phase, the image-capturing device 112 may be configured to capture the first image of the calibration system and transmit the first image to the vehicle device 114, the application server 120, or the database server 122. In an embodiment, in the implementation phase, the image-capturing device 112 may be configured to capture the second image of the road (or the route segment) along which the vehicle 102 is currently traversing. Upon capturing the second image, the image-capturing device 112 may be configured to transmit the second image to the processor 116, store the second image in the memory 118, transmit the second image to the application server 120, or transmit the second image to the database server 122. The second image may include the one or more on-road objects (such as the first object) or a portion of the one or more on-road objects that are present in a capturing range of the image-capturing device 112. The image-capturing device 112 may be structurally and functionally similar to the image-capturing device 106. However, the image-capturing device 106 is embedded within the vehicle device 104 whereas the image-capturing device 112 is a stand-alone device.

The vehicle device 114 may include suitable logic, circuitry, interfaces, and/or code, executable by the circuitry, that may be configured to perform one or more operations. The vehicle device 114 may be a computing device that is installed inside the vehicle 102. Examples of the vehicle device 114 may include, but are not limited to, a mobile phone, a tablet, a laptop, a vehicle head unit, or any other portable communication device that is placed inside the vehicle 102. The vehicle device 114 may be realized through various web-based technologies such as, but are not limited to, a Java web-framework, a .NET framework, a PHP framework, or any other web-application framework. The vehicle device 114 may be further realized through various embedded technologies such as, but are not limited to, microcontrollers or microprocessors that are operating on one or more operating systems such as Windows, Android, Unix, Ubuntu, Mac OS, or the like.

In an embodiment, the vehicle device 114 may be communicatively coupled to the image-capturing device 112 for receiving one or more images (such as the first image and the second image) captured by the image-capturing device 112. The vehicle device 114 may be configured to execute various processes of the calibration phase and the implementation phase by utilizing the processor 116 and the memory 118. In an embodiment, the processor 116 and the memory 118 may communicate with each other via a third communication bus (not shown).

The processor 116 may include suitable logic, circuitry, interfaces, and/or code, executable by the circuitry, that may be configured to perform one or more operations. Examples of the processor 116 may include, but are not limited to, an ASIC processor, a RISC processor, a CISC processor, and an FPGA. It will be apparent to a person of ordinary skill in the art that the processor 116 may be compatible with multiple operating systems.

In an embodiment, the one or more operations may be associated with the calibration phase and the implementation phase. In an embodiment, in the calibration phase, the processor 116 may be configured to receive the first image from the image-capturing device 112, or retrieve the first image from the memory 118 or the database server 122. The processor 116 may be further configured to process the first image to identify the plurality of lines such as the first and second calibration lines shown in FIGS. 3A, 3B, and 3C. Thereafter, the processor 116 may be configured to determine the orientation of the first and second calibration lines with respect to the calibration lane captured in the first image. In a scenario where the first and second calibration lines are perpendicular to the calibration lane, the processor 116 may be configured to identify the first and second rows of pixels (shown in FIG. 3B) in the first image. The first and second rows of pixels (i.e., the first plurality of rows of pixels) may correspond to the first and second calibration lines, respectively.

In an embodiment, the processor 116 may be further configured to determine the first width of the first calibration line corresponding to the first row of pixels. The first width of the first calibration line may be determined from the first image. Similarly, the processor 116 may determine the second width of the second calibration line corresponding to the second row of pixels of the first plurality of rows of pixels. The processor 116 may be further configured to determine the third width of the third line corresponding to the third row of pixels of the remaining rows of pixels (i.e., the second plurality of rows of pixels) in the first image. The third width of the third line may be determined based on at least the first or second width and the first angle between the first or second calibration line and the fourth line joining the first or second calibration line with the third line. The processor 116 may be further configured to estimate the first column values for each line corresponding to each row of pixels (i.e., the first and second plurality of rows of pixels) in the first image based on at least the corresponding width. For example, the first column values for the first calibration line, the second calibration line, or the third line may be determined based on the first width, the second width, or the third width, respectively. The processor 116 may be further configured to store the first column values of each line corresponding to each row of pixels in the memory 118. In another embodiment, the processor 116 may store the first column values in the database server 122.

In another scenario where the first and second calibration lines are determined to be parallel to the calibration lane, the processor 116 may be configured to determine the fourth width between the first and second calibration lines. The fourth width between the first and second calibration lines may be determined for each line corresponding to each row of pixels of the first image as observed from the first image. Further, for each line corresponding to each row of pixels in the first image, the processor 116 may be configured to estimate the second column values. The second column values may be estimated based on the fourth width of the corresponding row of pixels, the first vehicle width of the vehicle 102, and the actual lane width between the first and second calibration lines. The processor 116 may be further configured to store the second column values corresponding to each row of pixels in the memory 118. In another embodiment, the processor 116 may store the second column values in the database server 122.

In an embodiment, in the implementation phase, the processor 116 may be configured to retrieve the column values (such as the first or second column values) from the memory 118 or the database server 122. The processor 116 may be further configured to predict the driving lane for the vehicle 102 in the real-time based on the retrieved column values. The processor 116 may render the driving lane (predicted for the vehicle 102) on a display (not shown) of the vehicle device 114, or some other display integrated inside the vehicle 102.

Further, in an embodiment, the processor 116 may be configured to receive the second image from the image-capturing device 112, or retrieve the second image from the memory 118 or the database server 122. The processor 116 may be further configured to process the second image to detect the one or more on-road objects (such as the first object) captured in the second image. Further, the processor 116 may be configured to analyze the first object in the second image for impending collision with the vehicle 102 based on detection of the first object in the driving lane of the vehicle 102. When the first object is detected in the driving lane of the vehicle 102 and the first distance of the first object from the vehicle 102 is less than the threshold distance value, the processor 116 may be configured to generate the warning message and communicate the warning message to the driver of the vehicle 102 to provide driving assistance in the real-time. The warning message may be communicated to the driver by communicating an audio message, a video message, a haptic message, or the like.

The memory 118 may include suitable logic, circuitry, interfaces, and/or code, executable by the circuitry, that may be configured to store one or more instructions that are executed by the processor 116 to perform the one or more operations. The memory 118 may be configured to store the first image, the second image, and the column values such as the first or second column values. The memory 118 may be further configured to store the threshold distance value, the first vehicle width, the first width, the second width, the third width, the fourth width, and the actual lane width. Examples of the memory 118 may include, but are not limited to, a RAM, a ROM, a PROM, and an EPROM.

The application server 120 may include suitable logic, circuitry, interfaces, and/or code, executable by the circuitry, that may be configured to perform one or more operations for device calibration and lane prediction. The application server 120 may be a computing device, which may include a software framework, that may be configured to create the application server implementation and perform the various operations associated with the device calibration and lane prediction. The application server 120 may be realized through various web-based technologies, such as, but are not limited to, a Java web-framework, a .NET framework, a PHP framework, a python framework, or any other web-application framework. Examples of the application server 120 may include, but are not limited to, a personal computer, a laptop, or a network of computer systems. The application server 120 may be communicatively coupled to the vehicle device 104 or the image-capturing device 112 and vehicle device 114 via the communication network 124.

In an exemplary embodiment, the application server 120 may be configured to receive the first image from the image-capturing device 112, or retrieve the first image from the database server 122. The application server 120 may be further configured to process the first image to identify the plurality of lines such as the first and second calibration lines. Thereafter, the application server 120 may be configured to determine the orientation of the first and second calibration lines. In a scenario where the first and second calibration lines are perpendicular to the calibration lane, the application server 120 may be configured to identify the first and second rows of pixels. The first and second rows of pixels (i.e., the first plurality of rows of pixels) may correspond to the first and second calibration lines, respectively. The application server 120 may be further configured to determine the first width of the first calibration line corresponding to the first row of pixels. The first width of the first calibration line may be determined from the first image. Similarly, the application server 120 may determine the second width of the second calibration line corresponding to the second row of pixels of the first plurality of rows of pixels. The application server 120 may be further configured to determine the third width of the third line corresponding to the third row of pixels of the remaining rows of pixels (i.e., the second plurality of rows of pixels) in the first image. The third width of the third line may be determined based on at least the first or second width and the first angle between the first or second calibration line and the fourth line joining the first or second calibration line with the third line. The application server 120 may be further configured to estimate the first column values for each line corresponding to each row of pixels (i.e., the first and second plurality of rows of pixels) in the first image based on at least the corresponding width. For example, the first column values for the first calibration line, the second calibration line, or the third line may be determined based on the first width, the second width, or the third width, respectively. The application server 120 may be further configured to store the first column values in the memory 118 or the database server 122.

In another scenario where the first and second calibration lines are determined to be parallel to the calibration lane, the application server 120 may be configured to determine the fourth width between the first and second calibration lines. Further, for each line corresponding to each row of pixels in the first image, the application server 120 may be configured to estimate the second column values. The second column values may be estimated based on the fourth width of the corresponding row of pixels, the first vehicle width of the vehicle 102, and the actual lane width between the first and second calibration lines. The application server 120 may be further configured to store the second column values corresponding to each row of pixels in the memory 118 or the database server 122.

In an embodiment, in the implementation phase, the application server 120 may be configured to retrieve the column values (such as the first or second column values) from the memory 118 or the database server 122. The application server 120 may be further configured to predict the driving lane for the vehicle 102 in the real-time based on the retrieved column values. The application server 120 may render the driving lane (predicted for the vehicle 102) on a display (not shown) of the vehicle device 114, or some other display integrated inside the vehicle 102.

Further, in an embodiment, the application server 120 may be configured to receive the second image from the image-capturing device 112, or retrieve the second image from the database server 122. The application server 120 may be further configured to process the second image to detect the one or more on-road objects (such as the first object) captured in the second image. Further, the application server 120 may be configured to analyze the first object in the second image for impending collision with the vehicle 102. When the first object is detected in the driving lane of the vehicle 102 and the first distance of the first object from the vehicle 102 is less than the threshold distance value, the application server 120 may be configured to generate the warning message and communicate the warning message to the driver of the vehicle 102 to provide driving assistance in the real-time. The warning message may be communicated to the driver by communicating an audio message, a video message, a haptic message, or the like.

The database server 122 may include suitable logic, circuitry, interfaces, and/or code, executable by the circuitry, that may be configured to perform one or more operations, such as receiving, storing, processing, and transmitting queries, images, data, or content. The database server 122 may be a data management and storage computing device that is communicatively coupled to the vehicle device 104, the image-capturing device 112, the vehicle device 114, and the application server 120 via the communication network 124 to perform the one or more operations. In an exemplary embodiment, the database server 122 may be configured to manage and store one or more images (such as the first image) captured by the image-capturing device 106 or 112. The database server 122 may be further configured to manage and store one or more images (such as the second image) captured by the image-capturing device 106 or 112. The database server 122 may be further configured to manage and store the column values such as the first and second column values. The database server 122 may be further configured to manage and store one or more warning messages corresponding to one or more first distances of the one or more on-road objects from the vehicle 102. The database server 122 may be further configured to manage and store one or more warning messages corresponding to one or more time of collisions of the one or more on-road objects with the vehicle 102.

In an embodiment, the database server 122 may be configured to receive one or more queries from the processor 108, the processor 116, or the application server 120 via the communication network 124. Each query may correspond to an encrypted message that is decoded by the database server 122 to determine a request for retrieving requisite information. In response to each received query, the database server 122 may be configured to retrieve and communicate the requested information to the processor 108, the processor 116, or the application server 120 via the communication network 124. Examples of the database server 122 may include, but are not limited to, a personal computer, a laptop, or a network of computer systems.

The communication network 124 may include suitable logic, circuitry, interfaces, and/or code, executable by the circuitry, that may be configured to transmit queries, images, data, content, messages, and requests between various entities, such as the vehicle device 104, the image-capturing device 112, the vehicle device 114, the application server 120, and/or the database server 122. Examples of the communication network 124 may include, but are not limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, and a combination thereof. Various entities in the environment 100 may connect to the communication network 124 in accordance with various wired and wireless communication protocols, such as Transmission Control Protocol and Internet Protocol (TCP/IP), User Datagram Protocol (UDP), Long Term Evolution (LTE) communication protocols, or any combination thereof.

Although the present disclosure describes the calibration phase and the implementation phase being executed in association with the same vehicle (e.g., the vehicle 102), it will be apparent to a person of ordinary skill in the art that the scope of the disclosure is not limited to the same vehicle for executing the calibration phase and the implementation phase. In various other embodiments, the calibration phase and the implementation phase may be executed for two separate vehicles (such as a first vehicle and a second vehicle). In such a scenario, to ensure accuracy of the lane prediction, a position of an image-capturing device (such as the image-capturing device 106 or the image-capturing device 112) on the first vehicle in the calibration phase is the same as a position of another image-capturing device on the second vehicle in the implementation phase. Further, specification of the image-capturing devices used with the first vehicle and the second vehicle may be the same. Further, various dimensions of the first vehicle and the second vehicle may be similar. Various operations associated with the calibration of fixed image-capturing devices of vehicles for lane prediction have been described in detail in conjunction with FIGS. 2A, 2B, 3A-3E, and 4A-4B.

Figure 2A:
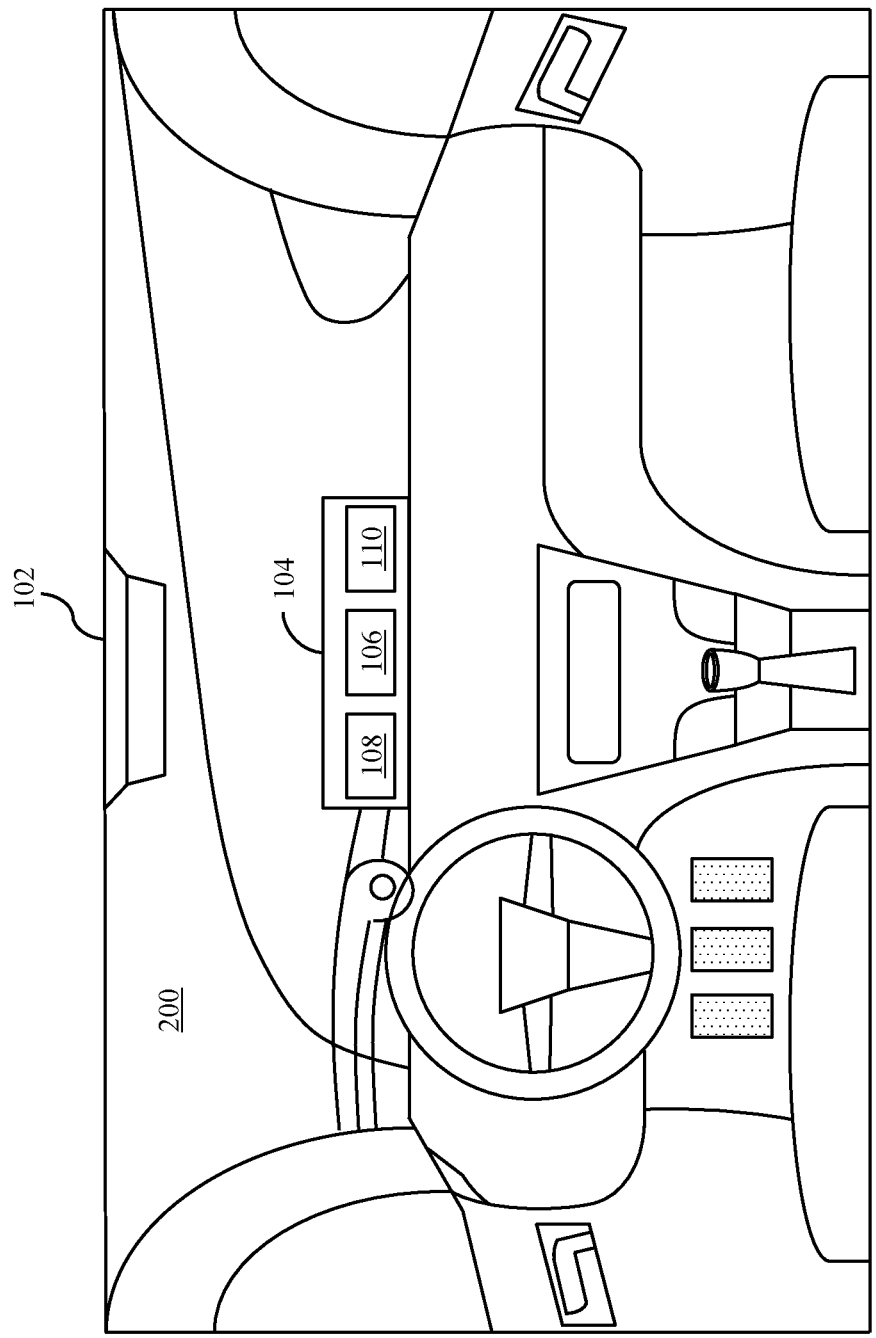
FIG. 2A is a diagram that illustrates an inside view of a vehicle of the environment of FIG. 1, in accordance with an exemplary embodiment of the disclosure.

FIG. 2A is a diagram that illustrates an inside view of the vehicle 102, in accordance with an exemplary embodiment of the disclosure. The vehicle 102 may include the vehicle device 104 that is installed on a front windshield 200 of the vehicle 102. The vehicle device 104 may include the image-capturing device 106, the processor 108, and the memory 110 that are communicatively coupled to each other via the first communication bus. Also, the vehicle device 104 may be communicatively coupled to the application server 120 via the communication network 124. In an embodiment, the image-capturing device 106 may be positioned perpendicular to the ground plane to ensure that sizes and distances of the various on-road objects (such as the first object) captured by the image-capturing device 106 are not distorted.

It will be apparent to a person of ordinary skill in the art that the scope of the disclosure is not limited to the installation of the vehicle device 104 as shown in FIG. 2A. In various other embodiments, the position of the vehicle device 104 may vary inside the vehicle 102, without limiting the scope of the disclosure. However, the position of the image-capturing device 106 in the vehicle 102 may remain intact with respect to the calibration phase and the implementation phase. For example, if the position of the image-capturing device 106 installed with the vehicle 102 is defined by x1, y1, and z1 coordinates in the calibration phase, then the position of the image-capturing device 106 installed with the vehicle 102 may be defined by the same x1, y1, and z1 coordinates in the implementation phase. The x1, y1, and z1 coordinates may be defined with respect to a fixed point associated with the vehicle 102.

Figure 2B:
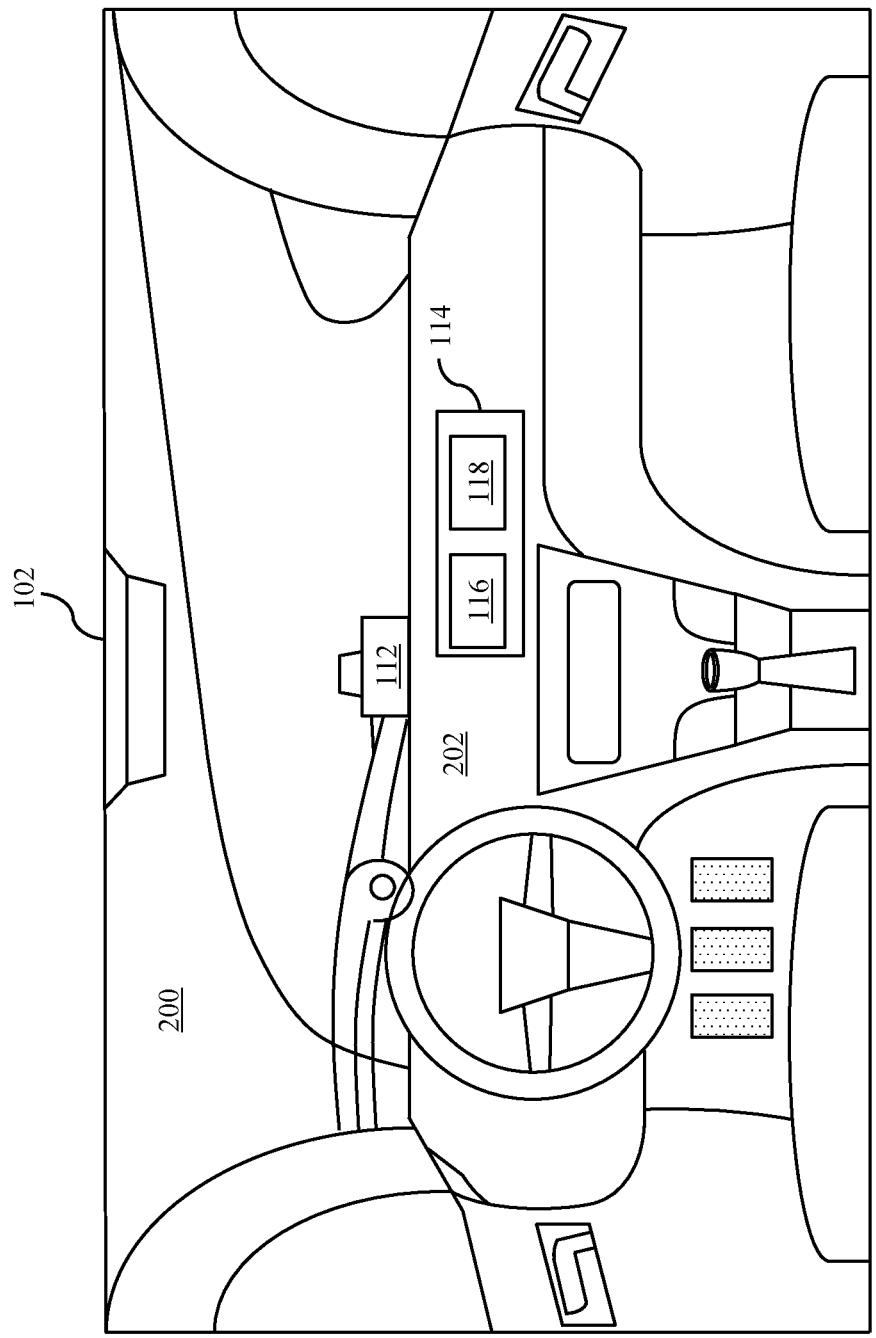
FIG. 2B is a diagram that illustrates an inside view of the vehicle, in accordance with another exemplary embodiment of the disclosure.

FIG. 2B is a diagram that illustrates an inside view of the vehicle 102, in accordance with another exemplary embodiment of the disclosure. The vehicle 102 may include the image-capturing device 112 that is installed on the front windshield 200 of the vehicle 102. The vehicle 102 may further include the vehicle device 114 that is installed on a dashboard 202 of the vehicle 102. The vehicle device 114 may include the processor 116 and the memory 118 that are communicatively coupled to each other via the third communication bus. The image-capturing device 112 may be communicatively coupled to the vehicle device 114 via the communication network 124 or the second communication bus. Also, the image-capturing device 112 and the vehicle device 114 may be communicatively coupled to the application server 120 via the communication network 124. In an embodiment, the image-capturing device 112 may be positioned perpendicular to the ground plane to ensure that sizes and distances of the various on-road objects captured by the image-capturing device 112 are not distorted.

It will be apparent to a person of ordinary skill in the art that the scope of the disclosure is not limited to the installation of the image-capturing device 112 and the vehicle device 114 as shown in FIG. 2B. In various other embodiments, the positions of the image-capturing device 112 and the vehicle device 114 may vary in the vehicle 102, without limiting the scope of the disclosure. However, the position of the image-capturing device 112 in the vehicle 102 may remain intact with respect to the calibration phase and the implementation phase. For example, if the position of the image-capturing device 112 installed with the vehicle 102 is defined by x2, y2, and z2 coordinates in the calibration phase, then the position of the image-capturing device 112 installed with the vehicle 102 may be defined by the same x2, y2, and z2 coordinates in the implementation phase. The x2, y2, and z2 coordinates may be defined with respect to a fixed point associated with the vehicle 102.

FIG. 3A is a diagram that illustrates a calibration system 300 for calibrating the image-capturing device 106 of the vehicle 102, in accordance with an exemplary embodiment of the disclosure. The calibration system 300 may include the vehicle 102 and the carpet 302 having the first and second calibration lines $c_1$ and $c_2$. The first and second calibration lines $c_1$ and $c_2$ may be associated with the same known width W (for example, the actual lane width) and may be at first and second known distances $d_1$ and $d_2$ from the vehicle 102, respectively. Further, the first and second calibration lines $c_1$ and $c_2$ may be parallel to each other and perpendicular to the path (i.e., the calibration lane) of the vehicle 102 in the calibration system 300. In an embodiment, the vehicle device 104 may be installed on the front windshield 200 of the vehicle 102 such that the image-capturing device 106 may be at the center of the front windshield 200. The image-capturing device 106 may be configured to capture the first image of the calibration system 300. In another embodiment, the image capturing device 112 may be installed at the center of the front windshield 200 for capturing the first image of the calibration system 300. For the sake of ongoing description, it is assumed that the vehicle device 104 is installed on the front windshield 200.

FIG. 3B is a diagram that illustrates a first image 304 captured by the image-capturing device 106, in accordance with an exemplary embodiment of the disclosure. The first image 304 may include the first and second calibration lines $c_1$ and $c_2$. In an exemplary embodiment, one or more points on the carpet 302 (that lie at a given distance from the vehicle 102) may be observed at the same distance (i.e., height) in the first image 304. In other words, the one or more points associated with the first calibration line $c_1$ painted on the carpet 302 at 5 m distance (i.e., the first known distance $d_1$) from the vehicle 102 may be observed in the first image 304 along the same row of pixels (i.e., the first row of pixels $r_1$). Similarly, the one or more points associated with the second calibration line $c_2$ painted on the carpet 302 at 10 m distance (i.e., the second known distance $d_2$) from the vehicle 102 may be observed in the first image 304 along the same row of pixels (i.e., the second row of pixels $r_2$). Thus, the first and second rows of pixels $r_1$ and $r_2$ may be at the first and second known distances $d_1$ and $d_2$ from the vehicle 102, respectively.

Since the first known distance $d_1$ is less than the second known distance $d_2$, the first width $w_1$ (i.e., a width of the first calibration line $c_1$ as observed in the first image 304) is greater than the second width $w_2$ (i.e., a width of the second calibration line $c_2$ as observed in the first image 304) even though the first and second calibration lines $c_1$ and $c_2$ may have the same width (i.e., the known width W) on the carpet 302. The difference in the first and second widths $w_1$ and $w_2$ may be represented by $\delta_w$. Further, when the first and second calibration lines $c_1$ and $c_2$ are centered with respect to an axis passing through the center of the image-capturing device 106, the difference in the first and second widths $w_1$ and $w_2$ may be symmetric on both sides of the axis (illustrated as $\delta_w/2$ in the first image 304 of FIG. 3B).

It will be apparent to a person of ordinary skill in the art that vertical edges of the carpet 302 (that are straight lines in the calibration system 300) may be observed as tilted lines in the first image 304 due to perspective distortion. In other words, the carpet 302 with a rectangular shape may be observed as a trapezoid in the first image 304. The distance between the first and second rows of pixels (illustrated by h in the first image 304) may correspond to the height of the trapezoid. An angle θ may be the first angle between the first calibration line $c_1$ and the fourth line joining the endpoints of the first and second calibration lines $c_1$ and $c_2$, as shown in FIG. 3B. Similarly, an angle α may be a second angle between the first calibration line $c_1$ and a fifth line joining other endpoints of the first and second calibration lines $c_1$ and $c_2$. The fourth and fifth lines may correspond to two non-parallel sides of the trapezoid and the angles θ and α may correspond to base angles of the trapezoid. When the first and second calibration lines $c_1$ and $c_2$ are centered with respect to the axis of the image-capturing device 106, lengths of the fourth and fifth lines may be equal and the angle θ may be equal to the angle α. In other words, the carpet 302 may be observed as an isosceles trapezoid in the first image 304.

In operation, the lane prediction mechanism associated with the vehicle 102 may be calibrated in the calibration phase to predict the driving lane for the vehicle 102 in the implementation phase. For the sake of ongoing description, it is assumed that the lane prediction mechanism may be realized and implemented by utilizing the vehicle device 104 that is installed with the vehicle 102. The vehicle device 104 may include the image-capturing device 106, the processor 108, and the memory 110. However, it will be apparent to a person of ordinary skill in the art that the scope of the disclosure is not limited to the realization and implementation of the lane prediction mechanism by utilizing the vehicle device 104. In various other embodiments, the lane prediction mechanism may be realized and implemented by utilizing the image-capturing device 112 and the vehicle device 114, the image-capturing device 112, the application server 120, and the database server 122, or any combination thereof.

In the calibration phase, the vehicle device 104 may be calibrated by utilizing the calibration system 300. The calibration system 300 may include the first and second calibration lines $c_1$ and $c_2$ on the carpet 302 such that the first and second calibration lines $c_1$ and $c_2$ may have the same width (i.e., the known width W) that is equal to a width of the carpet 302. Further, the first and second calibration lines $c_1$ and $c_2$ may be drawn at the first and second known distances $d_1$ and $d_2$ from the vehicle 102, respectively. The first and second calibration lines $c_1$ and $c_2$ may be parallel to each other and perpendicular to the path (i.e., the calibration lane) of the vehicle 102. In an embodiment, during execution of calibration processes of the calibration phase, the image-capturing device 106 (mounted at the center of the vehicle 102 of the calibration system 300) may be configured to capture the first image 304 of the calibration system 300. The first image 304 illustrates the first and second calibration lines $c_1$ and $c_2$ having the first and second widths $w_1$ and $w_2$, respectively. The first and second widths $w_1$ and $w_2$ are observed widths of the first and second calibration lines $c_1$ and $c_2$ in the first image 304. Upon capturing the first image 304, the image-capturing device 106 may be configured to transmit the first image 304 to the processor 108 or the memory 110. In an embodiment, a color model associated with the first image 304 is the RGB color model.

In an embodiment, the processor 108 may be configured to receive the first image 304 from the image-capturing device 106 (or retrieve the first image 304 from the memory 110) and process the first image 304 to identify the plurality of lines such as the first and second calibration lines $c_1$ and $c_2$ in the first image 304. The first and second calibration lines $c_1$ and $c_2$ may be parallel to each other and have the orientation in which the first and second calibration lines $c_1$ and $c_2$ are perpendicular to the calibration lane of the calibration system 300. The processor 108 may be further configured to identify the first plurality of rows of pixels (such as the first and second rows of pixels $r_1$ and $r_2$) in the first image 304. The first and second rows of pixels $r_1$ and $r_2$ may correspond to the first and second calibration lines $c_1$ and $c_2$, respectively. In one embodiment, the processor 108 may identify the first and second rows of pixels $r_1$ and $r_2$ based on one or more inputs provided by the administrator utilizing one or more input/output ports (not shown) of the vehicle device 104. In another embodiment, the processor 108 may be configured to convert the first image 304 from the RGB color model to another color model such as the HSV color model. Thereafter, the processor 108 may be further configured to filter the converted first image (not shown) to obtain a filtered first image including a predetermined color. The processor 108 may be further configured to process the filtered first image (shown in FIGS. 3D and 3E) by executing edge detection of the filtered first image to identify the first and second calibration lines $c_1$ and $c_2$ and the first and second rows of pixels $r_1$ and $r_2$ corresponding to the first and second calibration lines $c_1$ and $c_2$. In another embodiment, the first and second calibration lines $c_1$ and $c_2$ and the first and second rows of pixels $r_1$ and $r_2$ may also be identified by utilizing a crowdsourcing platform where other users (e.g., one or more crowd workers) may take up the related tasks, identify the first and second calibration lines $c_1$ and $c_2$ and the first and second rows of pixels $r_1$ and $r_2$ corresponding to the first and second calibration lines $c_1$ and $c_2$, and upload the identified first and second calibration lines $c_1$ and $c_2$ and the identified first and second rows of pixels $r_1$ and $r_2$ onto the crowdsourcing platform in an online manner. The afore-mentioned method for identifying the first and second calibration lines $c_1$ and $c_2$ and the first and second rows of pixels $r_1$ and $r_2$ has been described in detail in conjunction with FIGS. 3C-3E.

Further, as illustrated in FIG. 3B, the first width $w_1$ may be greater than the second width $w_2$ since the first known distance $d_1$ is less than the second known distance $d_2$. The difference between the first and second widths $w_1$ and $w_2$ may be represented by $\delta_w$. Since the first and second calibration lines $c_1$ and $c_2$ are centered with respect to the axis of the image-capturing device 106, the difference $\delta_w$ may also be symmetric. Thus, $\delta_w/2$ may be estimated by utilizing a first equation (1) as shown below:

$$\frac{\delta_w}{2} = h * \cot \theta \tag{1}$$

where,
h indicates a second distance between the first and second rows of pixels $(r_2-r_1)$, and
$\theta$ indicates the angle of the isosceles trapezoid.

Thus, the difference $\delta_w$ may be estimated by utilizing a second equation (2) as shown below:

$$\delta_w = 2*h*\cot\theta \tag{2}$$

In an embodiment, for one or more rows of pixels above the first row of pixels $r_1$, a width of a corresponding line may be reduced. Thus, for the third line (not shown) corresponding to the third row of pixels $r_3$ that is between the first and second rows of pixels $r_1$ and $r_2$ in the first image 304, the third width of the third line may be less than the first width $w_1$ and greater than the second width $w_2$. Hence, the third width of the third line may be estimated based on a change in width $\delta_w'$ of the third line with respect to either the first calibration line $c_1$ or the second calibration line $c_2$. For example, the third width $w_3$ of the third line with respect to the first calibration line $c_1$ may be estimated by utilizing a third equation (3) as shown below:

$$w_3 = w_1 - \delta_w' \tag{3}$$

where, $\delta_w' = 2*(r_3-r_1)*\cot\theta$.

Similarly, a width of a line corresponding to an "$i^{th}$" row of pixels $r_i$ above the first row of pixels $r_1$ may be estimated by utilizing a fourth equation (4) as shown below:

$$w_i = w_1 - 2*(r_i-r_1)*\cot\theta \tag{4}$$

where,
$(r_i-r_1)$ indicates the second distance between the "$i^{th}$" row of pixels $r_i$ and the first row of pixels $r_1$.

In an embodiment, for one or more rows of pixels below the first row of pixels, a width of a corresponding line may increase. Hence, a width of a line corresponding to a "$j^{th}$" row of pixels $r_3$ below the first row of pixels $r_1$ may be estimated by utilizing a fifth equation (5) as shown below:

$$w_j = w_1 + 2*(r_1-r_j)*\cot\theta \tag{5}$$

where,
$(r_1-r_j)$ indicates the second distance between the first row of pixels $r_1$ and the "$j^{th}$" row of pixels $r_j$.

Similarly, for one or more rows of pixels below the second row of pixels $r_2$, a width of a corresponding line may increase. Hence, the third width $w_3$ with respect to the second calibration line $c_2$ may be estimated by utilizing a sixth equation (6) as shown below:

$$w_3 = w_2 + \delta_w' \tag{6}$$

Similarly, a width of a line corresponding to a "$p^{th}$" row of pixels $r_p$ below the second row of pixels $r_2$ may be estimated by utilizing a seventh equation (7) as shown below:

$$w_p = w_2 + 2*(r_2-r_p)*\cot\theta \tag{7}$$

where,
$(r_2-r_p)$ indicates the second distance between the second row of pixels $r_2$ and the "$p^{th}$" row of pixels $r_p$.

Further, for one or more rows of pixels above the second row of pixels $r_2$, a width of a corresponding line may be reduced. Hence, a width of a line corresponding to a "$q^{th}$" row of pixels $r_q$ above the second row of pixels $r_2$ may be estimated by utilizing an eighth equation (8) as shown below:

$$w_q = w_2 - 2*(r_q-r_2)*\cot\theta \tag{8}$$

where,
$(r_q-r_2)$ indicates the second distance between the "$q^{th}$" row of pixels $r_q$ and the second row of pixels $r_2$.

Thus, for each of the remaining rows of pixels (i.e., the second plurality of rows of pixels) in the first image 304, the processor 108 may estimate the width of the corresponding line as described above and store the estimated width of each line in the memory 110 or the database server 12. Further, in an embodiment, the processor 108 may be configured to estimate the first column values for each line corresponding to each row of pixels in the first image 304. The first column values for each line corresponding to each row of pixels may be estimated based on at least the corresponding width. For example, the first column values for the first calibration line $c_1$, the second calibration line $c_2$, or the third line may be estimated based on the first width $w_1$, the second width $w_2$, or the third width $w_3$, respectively. In exemplary embodiment, the first width $w_1$, the second width $w_2$, or the third width $w_3$ may be represented in terms of the number of column pixels in the first image 304. For example, the first width $w_1$ of the first calibration line $c_1$ is 20 column pixels in the first image 304 that is 30 row pixels by 30 column pixels. The 20 column pixels are symmetrically distributed on both sides of the axis that passes through the image-capturing device 106. Thus, the first column values for the first calibration line $c_1$ may be estimated as 5 column pixels and 25 column pixels that are corresponding to the first row of pixels $r_1$.

As described above, a width of each line corresponding to each row of pixels in the first image 304 may be determined based on at least one of the first calibration line $c_1$, the second calibration line $c_2$, or the third line. Therefore, the first column values for each line (or each row of pixels) may be estimated based on at least one of the first width $w_1$, the second width $w_2$, or the third width $w_3$. The processor 108 may further store the first column values of each line corresponding to each row of pixels in the memory 110 or the database server 122. The vehicle device 104 may further utilize the first column values to predict the driving lane for the vehicle 102 in the implementation phase i.e., in the real-time driving scenarios.

In the implementation phase, when the vehicle 102 is traversing the road, the processor 108 may be configured to retrieve the first column values of each line corresponding to each row of pixels from the memory 110 or the database server 122. The processor 108 may be further configured to predict the driving lane for the vehicle 102 in the real-time based on the retrieved first column values, and present the driving lane to the driver of the vehicle 102 for driving on the road (shown in FIG. 5B). During the driving, the image-capturing device 106 may be configured to continuously capture the one or more images of the various on-road objects that are present in front of the vehicle 102. For example, the image-capturing device 106 may capture the second image of the first object on the road and transmit the second image to the processor 108, or store the second image in the memory 110.

The processor 108 may be configured to receive the second image from the image-capturing device 106 (or retrieve the second image from the memory 110) and process the second image to detect the first object (if any) in the second image. In an embodiment, the processor 108 may perform an object detection operation on the second image to detect the first object in the second image. The first object may be detected in the driving lane of the vehicle 102 in the real-time. Examples of the object detection may include a Haar based object detection, a histogram of oriented gradients (HOG) based object detection, an HOG and support vector machines (SVM) i.e., the HOG-SVM based object detection, deep learning based object detection (using a convolutional neural network (CNN) approach, a region-of-interest-CNN i.e., an R-CNN approach, a fast R-CNN approach, or a faster R-CNN approach), or any combination thereof. The object detection operation may detect a bottom edge, a first side edge, a second side edge, and a top edge of the first object in the second image. The object detection operation may further generate a bounding box including the first object based on the bottom edge, the first side edge, the second side edge, and the top edge. For example, the object detection operation may output a first rectangular bounding box (shown in FIGS. 5A and 5B) that may include the first object. Thereafter, the processor 108 may be configured to estimate an overlapping area between the first rectangular bounding box and the driving lane of the vehicle 102. The processor 108 may detect the first object for the impending collision when the overlapping area is greater than or equal to a threshold area. For example, if the overlapping area is greater than 35 percent of the driving lane, then the processor 108 may detect the first object for the impending collision.

Upon detection of the first object, the processor 108 may be configured to determine the first distance of the first object from the vehicle 102. In an exemplary embodiment, the first distance may be determined based on at least a fourth row of pixels in the second image and a length of a bonnet or hood of the vehicle 102. The fourth row of pixels may correspond to the detected bottom edge. Based on the fourth row of pixels, the processor 108 may determine a third distance of the first object from the image-capturing device 106 using one or more distance measuring techniques known in the art. Thereafter, the processor 108 may determine the first distance of the first object from the vehicle 102 based on the third distance and the length of the bonnet or hood of the vehicle 102. For example, the length of a bonnet or hood of the vehicle 102 may be subtracted from the third distance to determine the first distance. In another exemplary embodiment, the first distance may be determined based on a perceived width of the first object. The perceived width of the first object may be determined based on at least image processing of the second image. In another exemplary embodiment, the first distance may be determined based on a rate of change of the perceived width of the first object from one second image to another second image. In another exemplary embodiment, the first distance may be determined based on stereo camera-based distance estimation techniques. In another exemplary embodiment, the first distance may be determined based on radar/lidar based distance estimation techniques. In another exemplary embodiment, the first distance may be determined based on laser beam pixel area (LBPA) based image programming technique.

Further, the processor 108 may be configured to generate the warning message based on at least the first distance of the first object and communicate the warning message to the driver of the vehicle 102. For example, if the first distance is less than the threshold distance value, the processor 108 may generate the warning message indicating the impending collision of the vehicle 102 with the first object, and communicate the warning message to the driver for offering the driving assistance in the real-time that may help to prevent the impending collision. In some embodiments, the processor 108 may generate the warning message based on the first distance and a relative speed between the vehicle 102 and the first object. The processor 108 may communicate the warning message to the driver by communicating an audio message, a video message, a haptic message, or the like.

In some embodiments, other than the first object, the second image may include various other on-road objects. Distances of the various other on-road objects captured in the second image may be determined by executing one or more processes that are similar to the one or more processes for determining the first distance of the first object from the vehicle 102.

Although the disclosure describes the prediction of distances of the various on-road objects in front of the vehicle 102, it will be apparent to a person of ordinary skill in the art that the scope of the disclosure is not limited to the prediction of distances of the various on-road objects that are in the front of the vehicle 102. In an alternate embodiment, distances of various other on-road objects (that are behind the vehicle 102 and speeding towards the vehicle 102 along the same driving lane) may be determined in the similar manner as described above, without limiting the scope of the disclosure. For predicting the distances of the various other on-road objects (that are behind the vehicle 102), a rear image-capturing device (not shown) may be installed on a rear side of the vehicle 102.

Figure 3D:
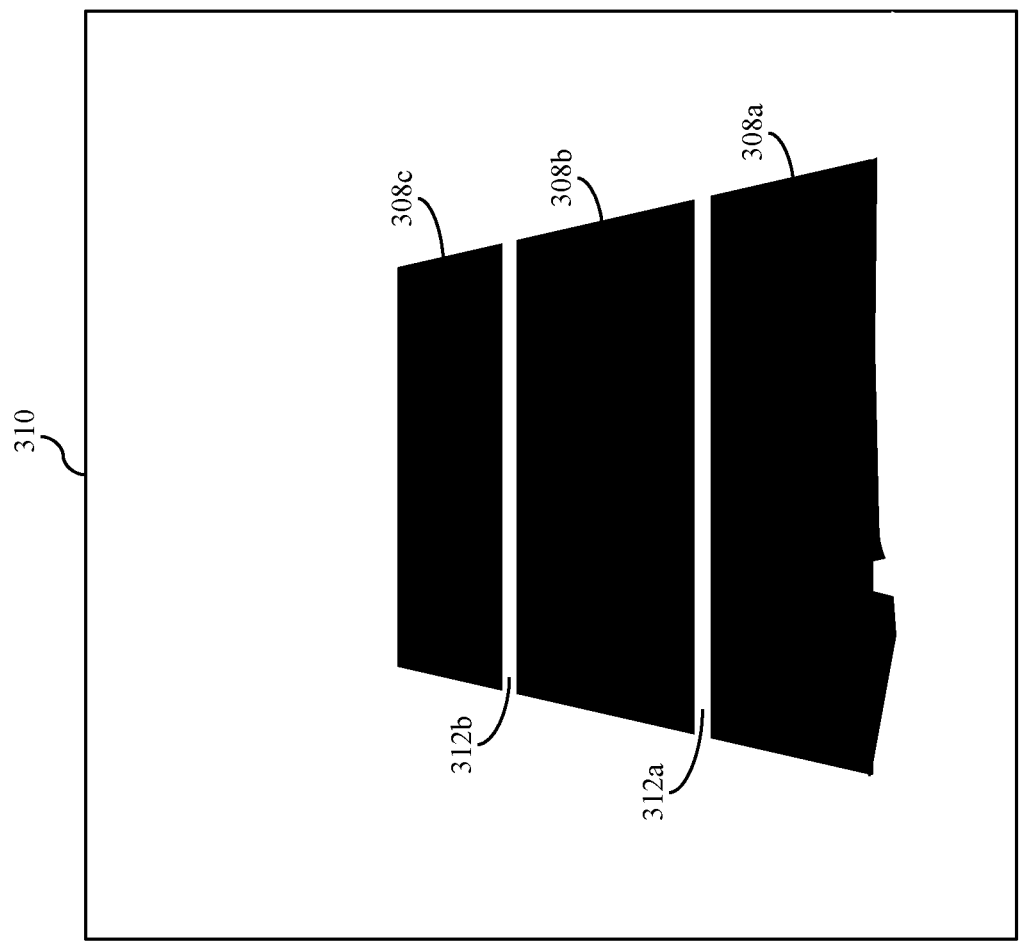
Figure 3E:
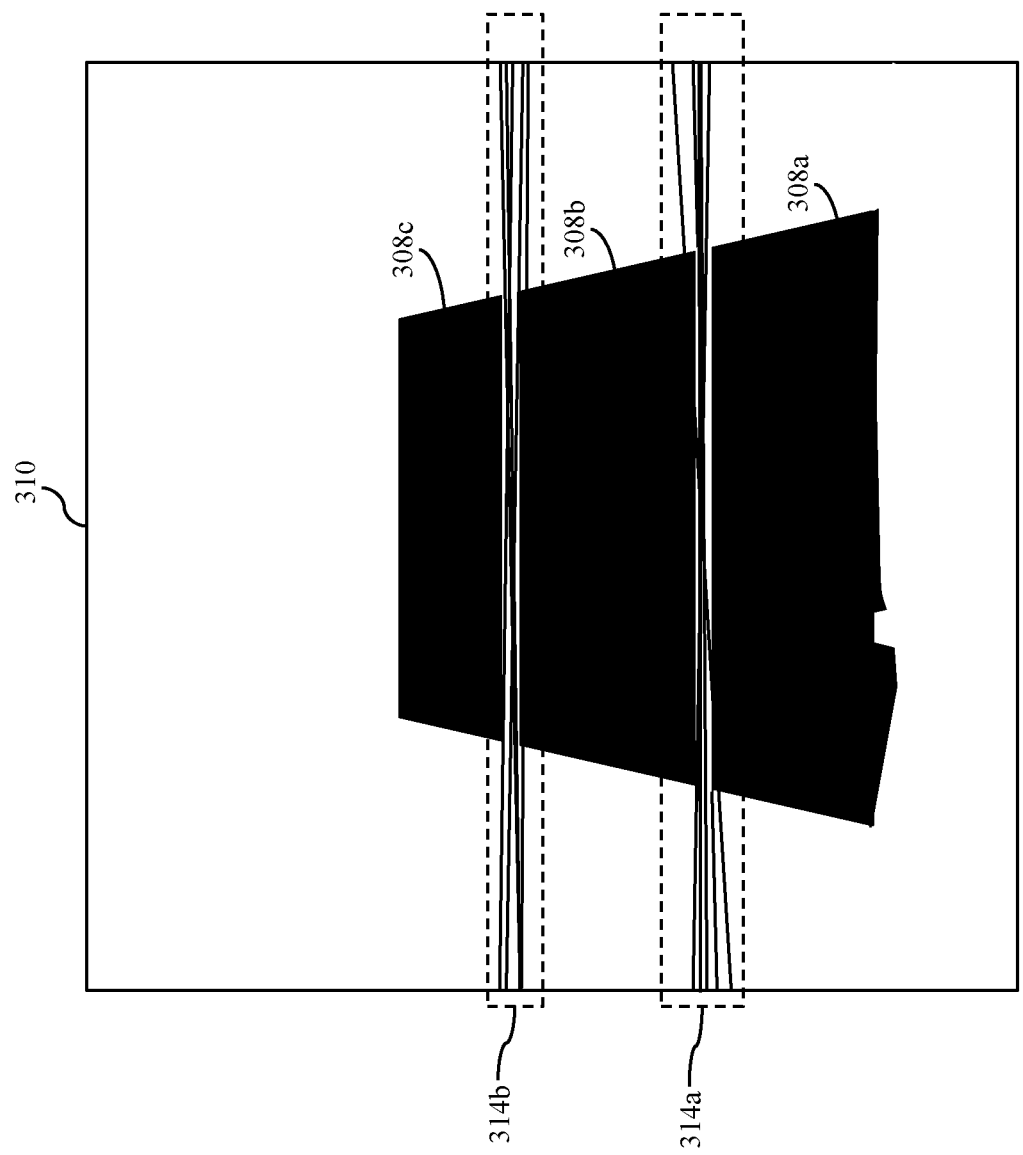

FIGS. 3C-3E are diagrams that collectively illustrate identification of one or more rows of pixels in the first image 304 corresponding to one or more calibration lines of FIG. 3A, respectively, in accordance with an exemplary embodiment of the disclosure. In an exemplary embodiment, FIGS. 3C-3E, collectively, illustrate identification of the first and second rows of pixels $r_1$ and $r_2$ corresponding to the first and second calibration lines $c_1$ and $c_2$, respectively. As illustrated in FIG. 3C, the image-capturing device 106 (installed on the front windshield 200) captures the first image 304 of the calibration system 300. Based on the capturing, the image-capturing device 106 may transmit the first image 304 to the processor 108. The first image 304 may include the carpet 302 and the first and second calibration lines $c_1$ and $c_2$ drawn on the carpet 302. The first and second calibration lines $c_1$ and $c_2$ may be at the first known distance $d_1$ (e.g., 5 m) and the second known distance $d_2$ (e.g., 10 m), respectively, from the vehicle 102 or the image-capturing device 106. As illustrated in FIG. 3C, the first and second calibration lines $c_1$ and $c_2$ may divide the carpet 302 into a plurality of sections such as sections 306a-306c. For simplicity of the ongoing discussion, a color of the carpet 302 used in the calibration system 300 has been assumed as green color.

Further, the color model associated with the first image 304 may be the RGB color model. However, the separation of color (i.e., separation of the green color of the carpet 302 from other colors in the first image 304) may be more distinct in the HSV color model as compared to the RGB color model. Thus, the processor 108 may be configured to convert the first image 304 from the RGB color model into the HSV color model. The processor 108 may be further configured to filter the converted first image to distinctly obtain the green color sections (i.e., the sections 306a-306c) in the converted first image. The sections 306a-306c of green color in the first image 304 have been illustrated as sections 308a-308c of black color in the filtered first image 310 (as illustrated in FIG. 3D). Further, the filtered first image 310 may include a section 312a (between the sections 308a and 308b) and a section 312b (between the sections 308b and 308c). The sections 312a and 312b may be indicative of the first and second calibration lines $c_1$ and $c_2$, respectively.

The processor 108 may be further configured to perform an edge detection operation on the filtered first image 310 to identify a set of lines 314a passing through the section 312a and a set of lines 314b passing through the section 312b. The sets of lines 314a and 314b are illustrated in FIG. 3E. The sets of lines 314a and 314b may be candidate lines for the first and second calibration lines $c_1$ and $c_2$, respectively. The processor 108 may be further configured to perform a Hough transform operation on the first filtered image 310 to identify first and second reference lines from the sets of lines 314a and 314b that correspond to the first and second calibration lines $c_1$ and $c_2$, respectively. In an example, the first and second reference lines may be identified from the sets of lines 314a and 314b, respectively, based on a slope of each line. The processor 108 may identify the first and second rows of pixels $r_1$ and $r_2$ based on the first and second reference lines, respectively. In an example, the processor 108 may identify the first and second rows of pixels $r_1$ and $r_2$ based on coordinates of the first and second reference lines, respectively.

FIG. 4A is a diagram that illustrates a calibration system 400 for calibrating the image-capturing device 106 of the vehicle 102, in accordance with another exemplary embodiment of the disclosure. The calibration system 400 shows the vehicle 102 and the carpet 302 having the first and second calibration lines $c_1$ and $c_2$. The first and second calibration lines $c_1$ and $c_2$ may be parallel to each other and parallel to the path (i.e., the calibration lane) of the vehicle 102 in the calibration system 400. In an embodiment, the vehicle device 104 may be installed on the front windshield 200 of the vehicle 102 such that the image-capturing device 106 may be at the center of the front windshield 200. The image-capturing device 106 may be configured to capture the first image (shown in FIG. 4B) of the calibration system 400. In another embodiment, the image capturing device 112 may be installed at the center of the front windshield 200 for capturing the first image of the calibration system 400. For the sake of ongoing description, it is assumed that the vehicle device 104 is installed on the front windshield 200.

FIG. 4B is a diagram that illustrates a first image 402 captured by the image-capturing device 106, in accordance with an exemplary embodiment of the disclosure. The first image 402 may include the first and second calibration lines $c_1$ and $c_2$ that appear as converging towards each other as shown in FIG. 4B. As a result, a width of each row of pixels (that is nearer to the vehicle 102) between the first and second calibration lines $c_1$ and $c_2$ in the first image 402 may be greater than a width of each row of pixels (that is away from the vehicle 102) between the first and second calibration lines $c_1$ and $c_2$ in the first image 402 even though the first and second calibration lines $c_1$ and $c_2$ may have the same width (i.e., the actual lane width). Such difference in widths may be represented by $\delta_w$. Further, when the first and second calibration lines $c_1$ and $c_2$ are centered with respect to the axis passing through the center of the image-capturing device 106, the difference in widths may be symmetric on both sides of the axis.

In operation, the lane prediction mechanism associated with the vehicle 102 may be calibrated in the calibration phase to predict the driving lane for the vehicle 102 in the implementation phase. For the sake of ongoing description, it is assumed that the lane prediction mechanism may be realized and implemented by utilizing the vehicle device 104 that is installed with the vehicle 102. The vehicle device 104 may include the image-capturing device 106, the processor 108, and the memory 110. However, it will be apparent to a person of ordinary skill in the art that the scope of the disclosure is not limited to the realization and implementation of the lane prediction mechanism by utilizing the vehicle device 104. In various other embodiments, the lane prediction mechanism may be realized and implemented by utilizing the image-capturing device 112 and the vehicle device 114, and the image-capturing device 112, the application server 120, and the database server 122, or any combination thereof.

In the calibration phase, the vehicle device 104 may be calibrated by utilizing the calibration system 400. The calibration system 400 may include the first and second calibration lines $c_1$ and $c_2$ that are parallel to each other and parallel to the calibration lane of the vehicle 102. In one example, a width (i.e., the actual lane width) between the first and second calibration lines $c_1$ and $c_2$ may be equal to a width of the carpet 302. In an embodiment, during execution of calibration processes of the calibration phase, the image-capturing device 106 (mounted at the center of the vehicle 102 of the calibration system 400) may be configured to capture the first image 402. The first image 402 illustrates the first and second calibration lines $c_1$ and $c_2$ (shown in FIG. 4B). Upon capturing the first image 402, the image-capturing device 106 may be configured to transmit the first image 402 to the processor 108 or the memory 110. In an embodiment, a color model associated with the first image 402 is the RGB color model.

In an embodiment, the processor 108 may be configured to receive the first image 402 from the image-capturing device 106 (or retrieve the first image 402 from the memory 110) and process the first image 402 to identify the plurality of lines such as the first and second calibration lines $c_1$ and $c_2$ in the first image 402. The first and second calibration lines $c_1$ and $c_2$ may be parallel to each other and have the orientation in which the first and second calibration lines $c_1$ and $c_2$ are also parallel to the path (i.e., the calibration lane) of the vehicle 102 in the calibration system 400. The processor 108 may be further configured to determine the fourth width (i.e., the observed width) between the first and second calibration lines $c_1$ and $c_2$. The fourth width between the first and second calibration lines $c_1$ and $c_2$ may be determined for each line corresponding to each row of pixels in the first image 402 as observed from the first image 402. Further, for each line corresponding to each row of pixels in the first image 402, the processor 108 may be configured to estimate the second column values. The second column values corresponding to each row of pixels may be estimated based on the fourth width of the corresponding row of pixels, the first vehicle width of the vehicle 102, and the actual lane width between the first and second calibration lines $c_1$ and $c_2$. The processor 108 may be further configured to store the second column values corresponding to each row of pixels in the memory 110. In another embodiment, the processor 108 may store the second column values in the database server 122. The vehicle device 104 may further utilize the second column values to predict the driving lane for the vehicle 102 in the implementation phase i.e., in the real-time driving scenarios.

In the implementation phase, when the vehicle 102 is traversing the road, the processor 108 may be configured retrieve the second column values of each line corresponding to each row of pixels from the memory 110 or the database server 122. The processor 108 may be further configured to predict the driving lane for the vehicle 102 in the real-time based on the retrieved second column values, and present the driving lane to the driver of the vehicle 102 for driving on the road (shown in FIG. 5B). During the driving, the image-capturing device 106 may be configured to continuously capture the one or more images of the various on-road objects that are present in front of the vehicle 102. For example, the image-capturing device 106 may capture the second image of the first object on the road and transmit the second image to the processor 108, or store the second image in the memory 110.

The processor 108 may be configured to receive the second image from the image-capturing device 106 (or retrieve the second image from the memory 110) and process the second image to detect the first object (if any) in the second image. In an embodiment, the processor 108 may perform an object detection operation on the second image to detect the first object in the second image. The first object may be detected in the driving lane of the vehicle 102 in the real-time. Examples of the object detection may include a Haar based object detection, a HOG based object detection, a HOG-SVM based object detection, deep learning-based object detection (using a CNN approach, an R-CNN approach, a fast R-CNN approach, or a faster R-CNN approach), or any combination thereof. The object detection operation may detect a bottom edge, a first side edge, a second side edge, and a top edge of the first object in the second image. The object detection operation may further generate a bounding box including the first object based on the bottom edge, the first side edge, the second side edge, and the top edge. For example, the object detection operation may output a first rectangular bounding box (shown in FIGS. 5A and 5B) that may include the first object. Thereafter, the processor 108 may be configured to estimate an overlapping area between the first rectangular bounding box and the driving lane of the vehicle 102. The processor 108 may detect the first object for the impending collision when the overlapping area is greater than or equal to the threshold area. For example, if the overlapping area is greater than 45 percent of the driving lane, then the processor 108 may detect the first object for the impending collision.

Upon detection of the first object, the processor 108 may be configured to determine the first distance of the first object from the vehicle 102. In an exemplary embodiment, the first distance may be determined based on at least a fourth row of pixels in the second image and a length of a bonnet or hood of the vehicle 102. The fourth row of pixels may correspond to the detected bottom edge. Based on the fourth row of pixels, the processor 108 may determine a third distance of the first object from the image-capturing device 106 using one or more distance measuring techniques known in the art. Thereafter, the processor 108 may determine the first distance of the first object from the vehicle 102 based on the third distance and the length of the bonnet or hood of the vehicle 102. For example, the length of a bonnet or hood of the vehicle 102 may be subtracted from the third distance to determine the first distance. In another exemplary embodiment, the first distance may be determined based on a perceived width of the first object. The perceived width of the first object may be determined based on at least image processing of the second image. In another exemplary embodiment, the first distance may be determined based on a rate of change of the perceived width of the first object from one second image to another second image. In another exemplary embodiment, the first distance may be determined based on stereo camera-based distance estimation techniques. In another exemplary embodiment, the first distance may be determined based on radar/lidar based distance estimation techniques. In another exemplary embodiment, the first distance may be determined based on Laser beam pixel area (LBPA) based image programming technique.

Further, the processor 108 may be configured to generate the warning message based on at least the first distance of the first object and communicate the warning message to the driver of the vehicle 102. For example, if the first distance is less than the threshold distance value, the processor 108 may generate the warning message indicating the impending collision of the vehicle 102 with the first object, and communicate the warning message to the driver for offering the driving assistance in the real-time that may help to prevent the impending collision. In some embodiments, the processor 108 may generate the warning message based on the first distance and the relative speed between the vehicle 102 and the first object. The processor 108 may communicate the warning message to the driver by communicating an audio message, a video message, a haptic message, or the like.

In some embodiments, other than the first object, the second image may include various other on-road objects. Distances of the various other on-road objects captured in the second image may be determined by executing a process that is similar to the process for determining the first distance of the first object from the vehicle 102.

Although the disclosure describes the prediction of distances of the various on-road objects in front of the vehicle 102, it will be apparent to a person of ordinary skill in the art that the scope of the disclosure is not limited to the prediction of distances of the various on-road objects that are in the front of the vehicle 102. In an alternate embodiment, distances of various other on-road objects (that are behind the vehicle 102 and speeding towards the vehicle 102 along the same driving lane) may be determined in the similar manner as described above, without limiting the scope of the disclosure. For predicting the distances of the various other on-road objects (that are behind the vehicle 102), a rear image-capturing device (not shown) may be installed on a rear side of the vehicle 102.

Figure 5A:
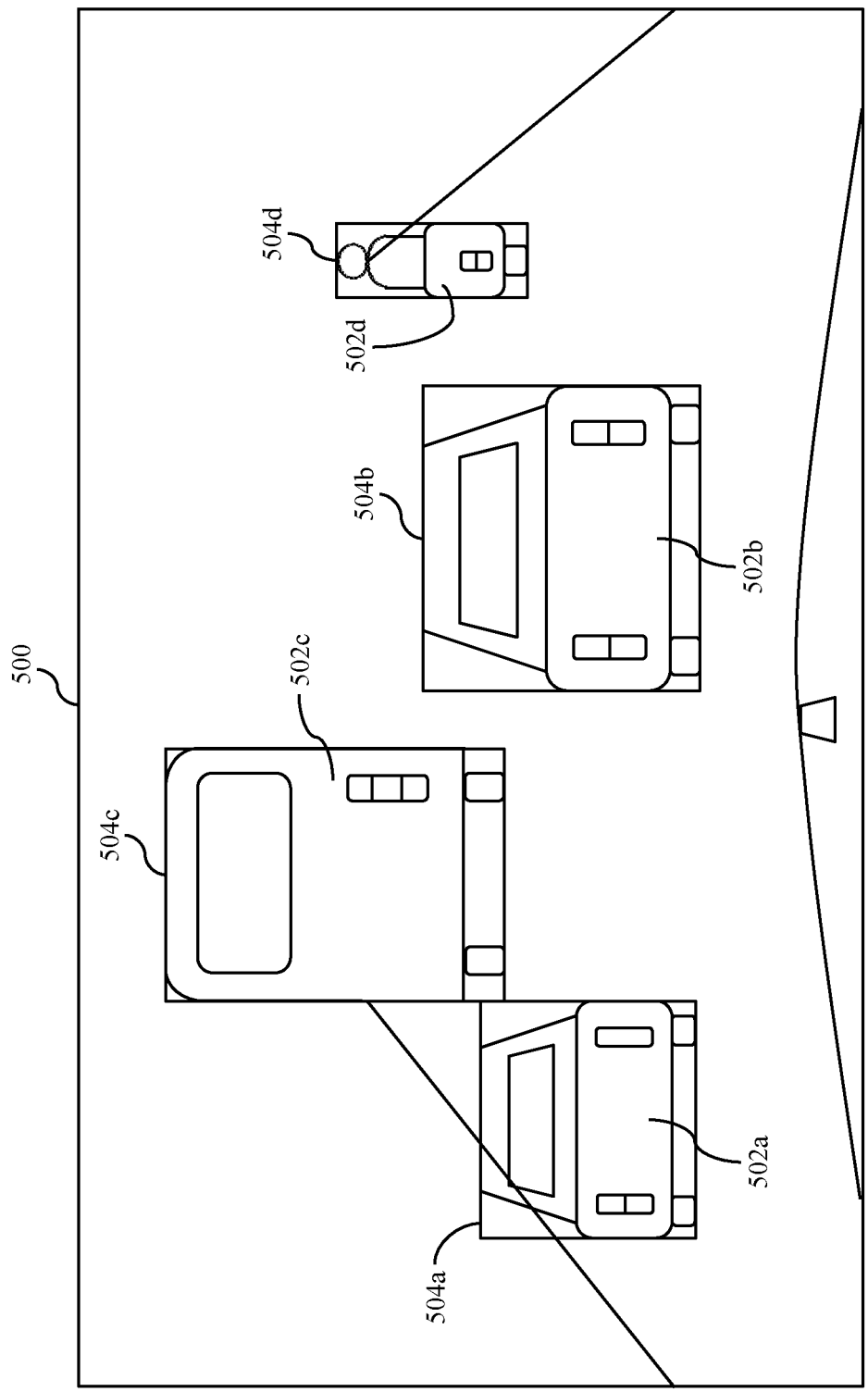
FIG. 5A is a diagram that illustrates a second image including objects captured by the image-capturing device, in accordance with an exemplary embodiment of the disclosure.

FIG. 5A is a diagram that illustrates a second image 500 including on-road objects captured by the image-capturing device 106, in accordance with an exemplary embodiment of the disclosure. The second image 500 may include objects 502a-502d present on the road in front of the vehicle 102. For example, the objects 502a and 502b are cars, the object 502c is a truck, and the object 504d is a bike. In an embodiment, the object 502a is the first object. In another embodiment, the object 502b is the first object. In another embodiment, the object 502c is the first object. In another embodiment, the object 502d is the first object. The second image 500 may further include rectangular bounding-boxes 504a-504d around the borders of the objects 502a-502d indicating likely positions of the objects 502a-502d in the second image 500, respectively. The rectangular bounding-boxes 504a-504d may be obtained as a result of the object detection operation performed by the processor 108 on the second image 500.

Figure 5B:
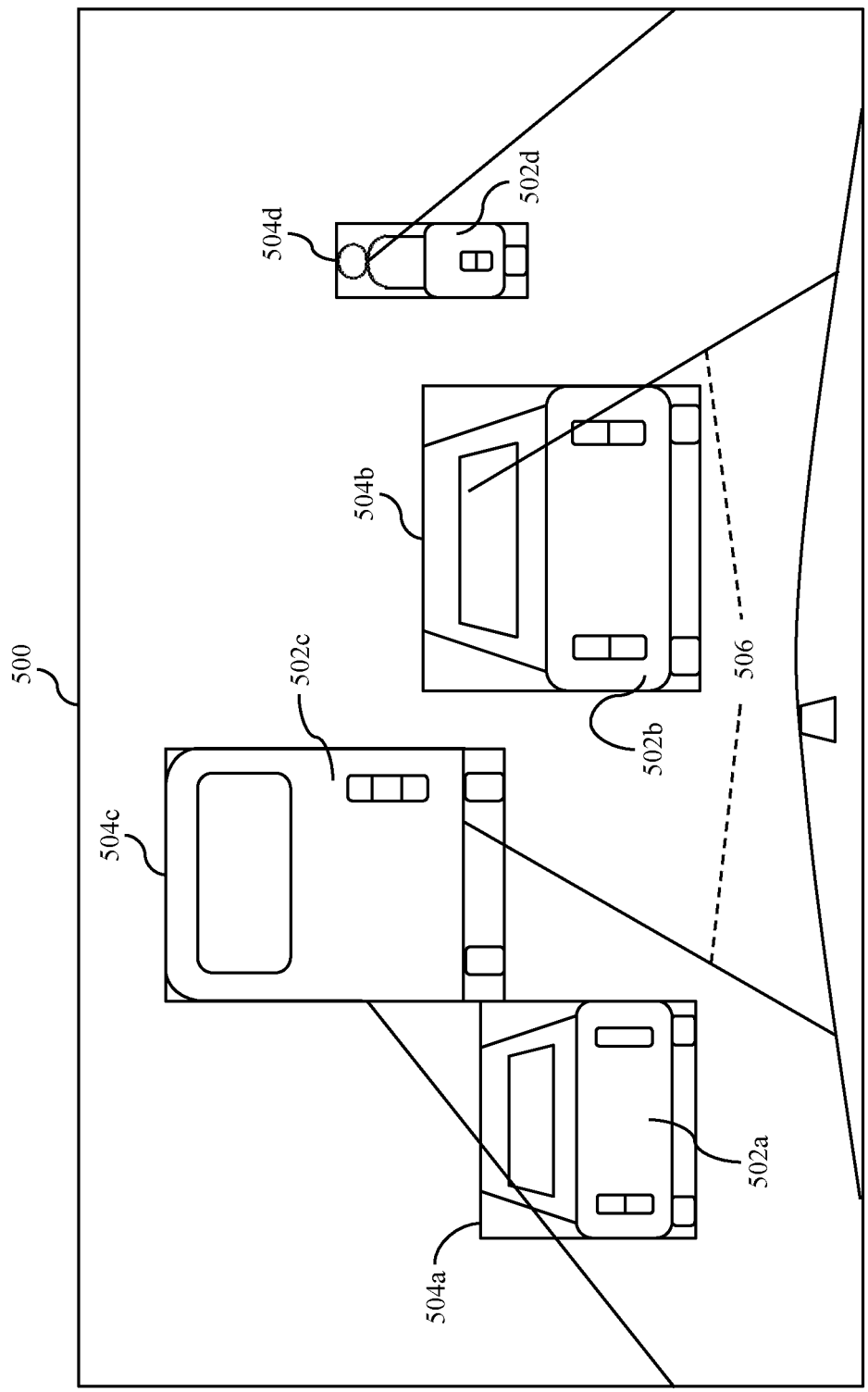
FIG. 5B is a diagram that illustrates a predicted driving lane for the vehicle, in accordance with an exemplary embodiment of the disclosure.

FIG. 5B is a diagram that illustrates the predicted driving lane 506 for the vehicle 102, in accordance with an exemplary embodiment of the disclosure. As illustrated in FIG. 5B, the object 502b and the object 502c are detected in the predicted driving lane 506. The object 502b is determined at a distance of 7 m from the vehicle 102 and the object 502c is determined at a distance of 11 m from the vehicle 102. The predicted distance (i.e., the first distance) of each object in front of the vehicle 102 may be presented to the driver of the vehicle 102. Further, the overlapping area of the object 502b with the predicted driving lane 506 is determined as 90 percent, and the overlapping area of the object 502c with the predicted driving lane 506 is determined as 15 percent. Since, the overlapping area of the object 502b is greater than the threshold area (e.g., 35 percent) and the overlapping area of the object 502c is less than the threshold area, the object 502b may be detected for the possible impending collision with the vehicle 102. Thus, based on the determined distance of the object 502b and the relative speed between the vehicle 102 and the object 502b, the warning message may be generated and communicated to the driver. For example, if the predicted distances of any of the objects 502b and 502c (such as the object 502b that is detected in the predicted driving lane 506) is less than the threshold distance value, then a time to collision of the vehicle 102 with the object 502b may be determined. The time to collision may be determined based on the predicted distance and the relative speed between the vehicle 102 and the object 502b. Based on the determined time to collision, the warning message indicating the impending collision may be generated and communicated to the driver of the vehicle 102. The warning message may be communicated in the form of a text message, an audio signal, a video signal, or the like.

Figure 6A:
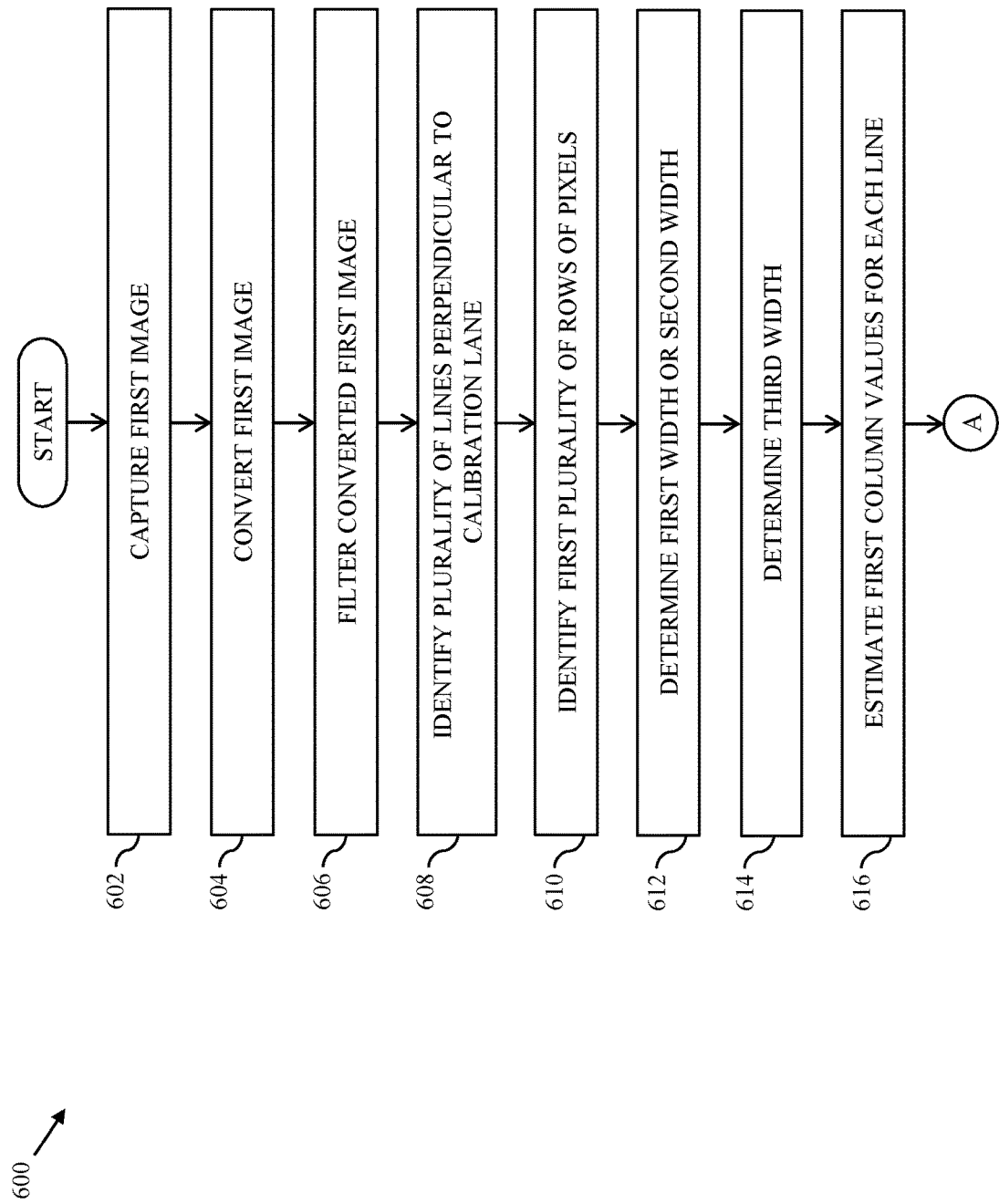
FIGS. 6A and 6B, collectively, illustrate a flow chart of a method for calibrating the fixed image-capturing device of the vehicle for predicting the driving lane, in accordance with an exemplary embodiment of the disclosure.
Figure 6B:
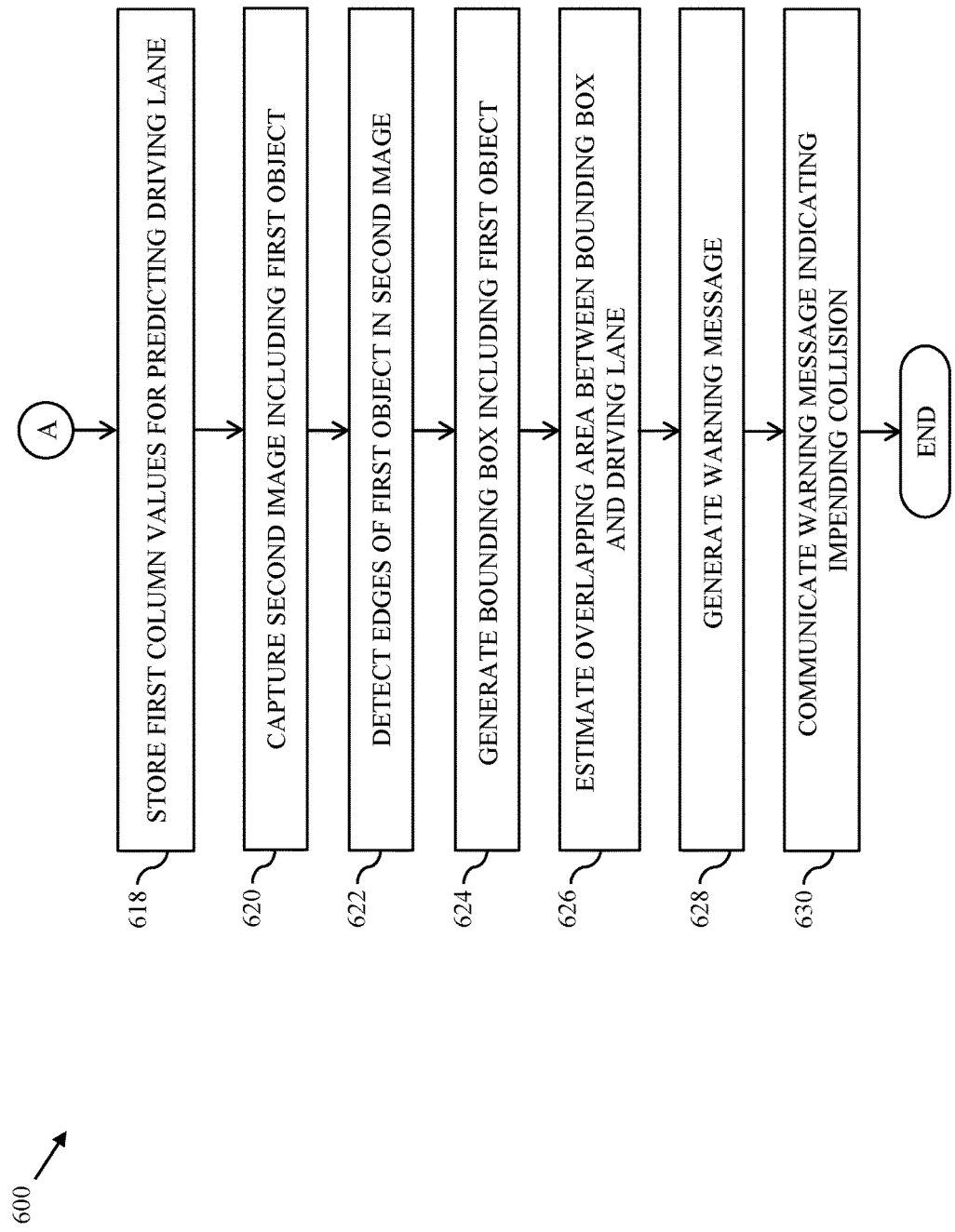

FIGS. 6A and 6B, collectively, illustrate a flow chart 600 of a method for calibrating a fixed image-capturing device (such as the image-capturing device 106 or 112) of the vehicle 102 and predicting the driving lane 506 for the vehicle 102, in accordance with an exemplary embodiment of the disclosure.

At 602, the first image 304 is captured. In an embodiment, the image-capturing device 106 may be configured to capture the first image 304. At 604, the first image 304 is converted. In an embodiment, the processor 108 may be configured to convert the first image 304 from a first color model to a second color model. The first color model and the second color model may be at least one of a black and white color model, a greyscale color model, a red, green, and blue (RGB) color model, a hue, saturation, and value (HSV) color model, a cyan, magenta, yellow, and black (CMYK) color model, a hue, saturation, and brightness (HSB) color model, a hue, saturation, and lightness (HSL) color model, or a hue, chroma, and value (HCV) color model. In an embodiment, the first color model is different from the second color model. For example, the first image 304 may be converted from the RGB color model into the HSV color model.

At 606, the converted first image is filtered. In an embodiment, the processor 108 may be configured to filter the converted first image to obtain the filtered first image 310. At 608, the plurality of lines perpendicular to the calibration lane are identified. In an embodiment, the processor 108 may be configured to identify the plurality of lines such as the first and second calibration lines $c_1$ and $c_2$ in the first image 304 by executing the edge detection of the filtered first image 310. At 610, the first plurality of rows of pixels are identified. In an embodiment, the processor 108 may be configured to identify the first plurality of rows of pixels (such as the first and second rows of pixels $r_1$ and $r_2$) in the first image 304. The first and second rows of pixels $r_1$ and $r_2$ may correspond to the first and second calibration lines $c_1$ and $c_2$, respectively.

At 612, the first width or the second width is determined. In an embodiment, the processor 108 may be configured to determine the first width of the first calibration line $c_1$ corresponding to the first row of pixels $r_1$. The first width may be determined from the first image 304. In an embodiment, the processor 108 may be configured to determine the second width of the second calibration line $c_2$ corresponding to the second row of pixels $r_2$. The first width may be determined from the first image 304. At 614, the third width is determined. In an embodiment, the processor 108 may be configured to determine the third width of the third line corresponding to the third row of pixels of the remaining rows of pixels (i.e., the second plurality of rows of pixels) in the first image 304. The third width may be determined based on at least the first or second width and the first angle. In exemplary embodiment, the first width, the second width, or the third width may be determined in terms of the number of column pixels of the first image 304.

At 616, the first column values for each line are estimated. In an embodiment, the processor 108 may be configured to estimate the first column values for each line corresponding to each row of pixels (i.e., the first and second plurality of rows of pixels) based on at least the corresponding width. At 618, the first column values are stored for predicting the driving lane 506. In an embodiment, the processor 108 may be configured to store the first column values of each line corresponding to each row of pixels of the first image 304 in the memory 110. The driving lane 506 for the vehicle 102 may be predicted in the real-time based on the first column values.

At 620, the second image 500 including at least the first object (such as the object 502b) is captured. In an embodiment, the image-capturing device 106 may be configured to capture the second image 500. At 622, the edges of the first object are detected in the second image 500. In an embodiment, the processor 108 may be configured to detect the edges such as the bottom edge, the first side edge, the second side edge, and the top edge of the first object by executing the object detection operation on the second image 500. At 624, the bounding box including the first object is generated. In an embodiment, the processor 108 may be configured to generate the bounding box including the first object based on the bottom edge, the first side edge, the second side edge, and the top edge. Examples of such bounding boxes have been shown in FIGS. 5A and 5B.

At 626, the overlapping area between the bounding box and the driving lane 506 is estimated. In an embodiment, the processor 108 may be configured to estimate the overlapping area between the bounding box and the driving lane 506. The processor 108 may identify the first object for the impending collision with the vehicle 102 when the overlapping area is greater than or equal to the threshold area.

At 628, the warning message is generated. In an embodiment, when the overlapping area is greater than or equal to the threshold area, the processor 108 may be configured to generate the warning message based on at least the first distance of the first object from the vehicle 102. In some embodiments, the processor 108 may generate the warning message based on the first distance and the relative speed between the vehicle 102 and the first object. At 630, the warning message indicating the impending collision is communicated. In an embodiment, the processor 108 may be configured to communicate the warning message to the driver of the vehicle 102.

FIGS. 7A and 7B, collectively, illustrate a flow chart 700 of a method for calibrating a fixed image-capturing device (such as the image-capturing device 106 or 112) of the vehicle 102 and predicting the driving lane 506 for the vehicle 102, in accordance with another exemplary embodiment of the disclosure.

At 702, the first image 402 is captured. In an embodiment, the image-capturing device 106 may be configured to capture the first image 402. At 704, the first image 402 is converted. In an embodiment, the processor 108 may be configured to convert the first image 402 from a first color model to a second color model. The first color model and the second color model may be at least one of a black and white color model, a greyscale color model, a red, green, and blue (RGB) color model, a hue, saturation, and value (HSV) color model, a cyan, magenta, yellow, and black (CMYK) color model, a hue, saturation, and brightness (HSB) color model, a hue, saturation, and lightness (HSL) color model, or a hue, chroma, and value (HCV) color model. In an embodiment, the first color model is different from the second color model. For example, the first image 402 may be converted from the RGB color model into the HSV color model.

At 706, the converted first image is filtered. In an embodiment, the processor 108 may be configured to filter the converted first image to obtain a filtered image such as the filtered first image 310. At 708, the plurality of lines parallel to the calibration lane are identified. In an embodiment, the processor 108 may be configured to identify the plurality of lines such as the first and second calibration lines $c_1$ and $c_2$ in the first image 402 by executing the edge detection of the filtered first image.

At 710, for each row of pixels in the first image 402, the observed width is determined between the plurality of lines. In an embodiment, the processor 108 may be configured to determine the fourth width (i.e., the observed width) between the plurality of lines such as the first and second calibration lines $c_1$ and $c_2$. The fourth width may be determined for each line corresponding to each row of pixels in the first image 402 as observed from the first image 402.

At 712, the second column values are estimated for each row of pixels. In an embodiment, the processor 108 may be configured to estimate the second column values. The second column values corresponding to each row of pixels may be estimated based on the fourth width of the corresponding row of pixels, the first vehicle width of the vehicle 102, and the actual lane width between the first and second calibration lines $c_1$ and $c_2$.

At 714, the second column values are stored for predicting the driving lane 506. In an embodiment, the processor 108 may be configured to store the second column values of each line corresponding to each row of pixels of the first image 402 in the memory 110. The driving lane 506 for the vehicle 102 may be predicted in the real-time based on the second column values.

At 716, the second image 500 including at least the first object (such as the object 502b) is captured. In an embodiment, the image-capturing device 106 may be configured to capture the second image 500. At 718, the edges of the first object are detected in the second image 500. In an embodiment, the processor 108 may be configured to detect the edges such as the bottom edge, the first side edge, the second side edge, and the top edge of the first object by executing the object detection operation on the second image 500. At 720, the bounding box including the first object is generated. In an embodiment, the processor 108 may be configured to generate the bounding box including the first object based on the bottom edge, the first side edge, the second side edge, and the top edge. Examples of such bounding boxes have been shown in FIGS. 5A and 5B.

At 722, the overlapping area between the bounding box and the driving lane 506 is estimated. In an embodiment, the processor 108 may be configured to estimate the overlapping area between the bounding box and the driving lane 506. The processor 108 may identify the first object for the impending collision with the vehicle 102 when the overlapping area is greater than or equal to the threshold area.

At 724, the warning message is generated. In an embodiment, when the overlapping area is greater than or equal to the threshold area, the processor 108 may be configured to generate the warning message based on at least the first distance of the first object from the vehicle 102. In some embodiments, the processor 108 may generate the warning message based on the first distance and the relative speed between the vehicle 102 and the first object. At 726, the warning message indicating the impending collision is communicated. In an embodiment, the processor 108 may be configured to communicate the warning message to the driver of the vehicle 102.

Figure 8:
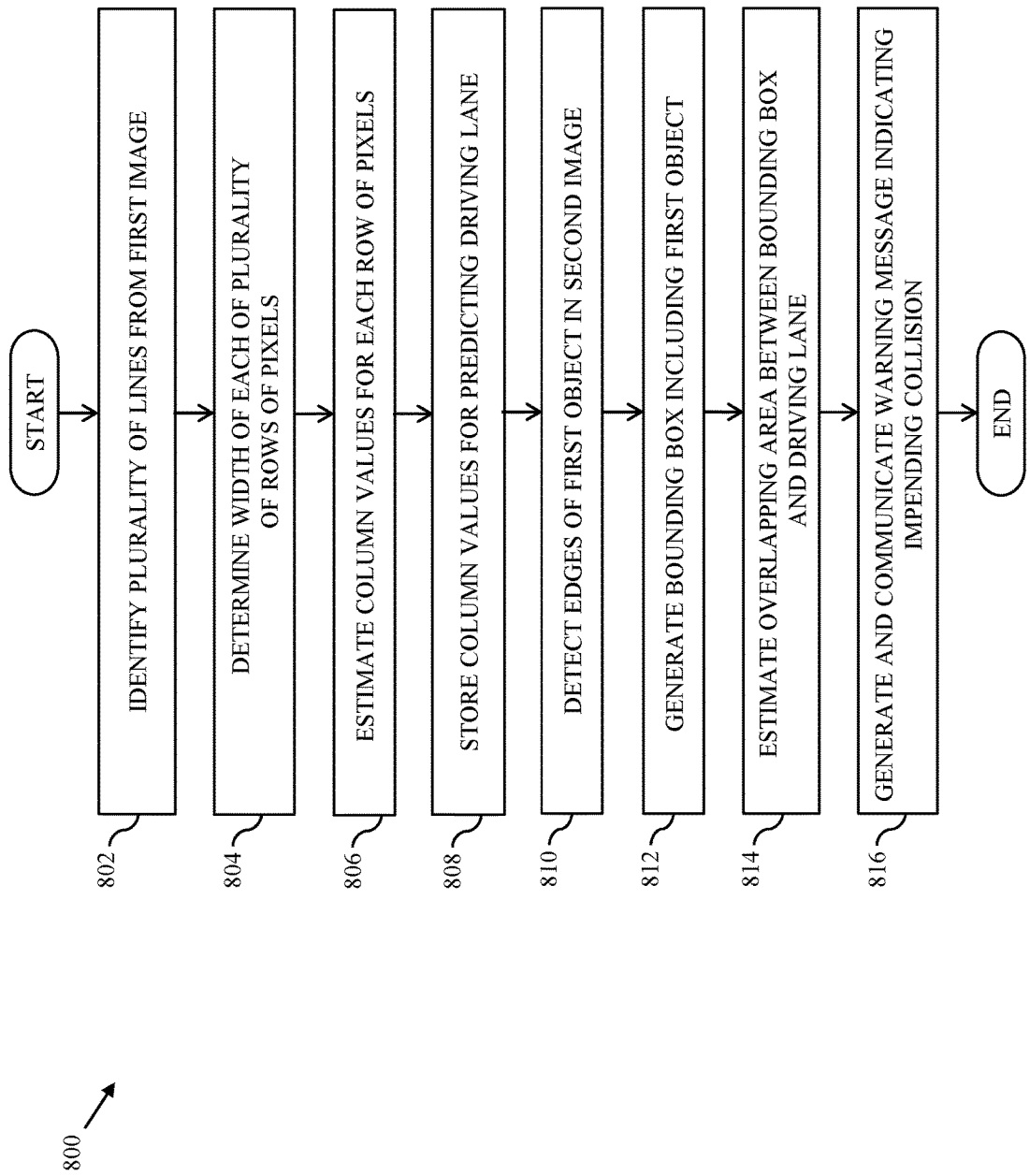
FIG. 8 illustrates a flow chart of a method for calibrating the fixed image-capturing device of the vehicle for predicting the driving lane, in accordance with another exemplary embodiment of the disclosure.

FIG. 8 illustrates a flow chart 800 of a method for calibrating a fixed image-capturing device (such as the image-capturing device 106 or 112) of the vehicle 102 and predicting the driving lane 506 for the vehicle 102, in accordance with another exemplary embodiment of the disclosure.

At 802, the plurality of lines is identified from the first image 304 or 402. In an embodiment, the processor 108 may be configured to identify the plurality of lines such as the first and second calibration lines $c_1$ and $c_2$ from the first image 304 or 402. In one embodiment, the plurality of lines may be perpendicular to the calibration lane of the vehicle 102. In another embodiment, the plurality of lines may be parallel to the calibration lane of the vehicle 102.

At 804, a width of each of a plurality of rows of pixels in the first image 304 or 402 is determined. In an embodiment, the processor 108 may be configured to determine the width (such as the first width, the second width, the third width, the fourth width, or the like) of each of the plurality of rows of pixels based on at least one of the plurality of lines.

At 806, the column values are estimated for each row of pixels. In an embodiment, for each of the plurality of rows of pixels in the first image 304 or 402, the processor 108 may be configured to estimate the column values (such as the first column values or the second column values) based on at least the width of the corresponding row of pixels.

At 808, the column values are stored for predicting the driving lane 506. In an embodiment, the processor 108 may be configured to store the column values of each line corresponding to each row of pixels of the first image 304 or 402 in the memory 110. The driving lane 506 for the vehicle 102 may be predicted in the real-time based on the column values.

At 810, the edges of the first object (such as the object 502b) are detected in the second image 500. In an embodiment, the processor 108 may be configured to detect the edges such as the bottom edge, the first side edge, the second side edge, and the top edge of the first object by executing the object detection operation on the second image 500.

At 812, the bounding box including the first object is generated. In an embodiment, the processor 108 may be configured to generate the bounding box including the firth object based on the bottom edge, the first side edge, the second side edge, and the top edge. Examples of such bounding boxes have been shown in FIGS. 5A and 5B.

At 814, the overlapping area between the bounding box and the driving lane 506 is estimated. In an embodiment, the processor 108 may be configured to estimate the overlapping area between the bounding box and the driving lane 506. The processor 108 may identify the first object for the impending collision with the vehicle 102 when the overlapping area is greater than or equal to the threshold area.

At 816, the warning message indicating the impending collision is generated and communicated. In an embodiment, when the overlapping area is greater than or equal to the threshold area, the processor 108 may be configured to generate and communicate the warning message based on at least the first distance of the first object from the vehicle 102. In some embodiments, the processor 108 may generate and communicate the warning message based on the first distance and the relative speed between the vehicle 102 and the first object.

Figure 9:
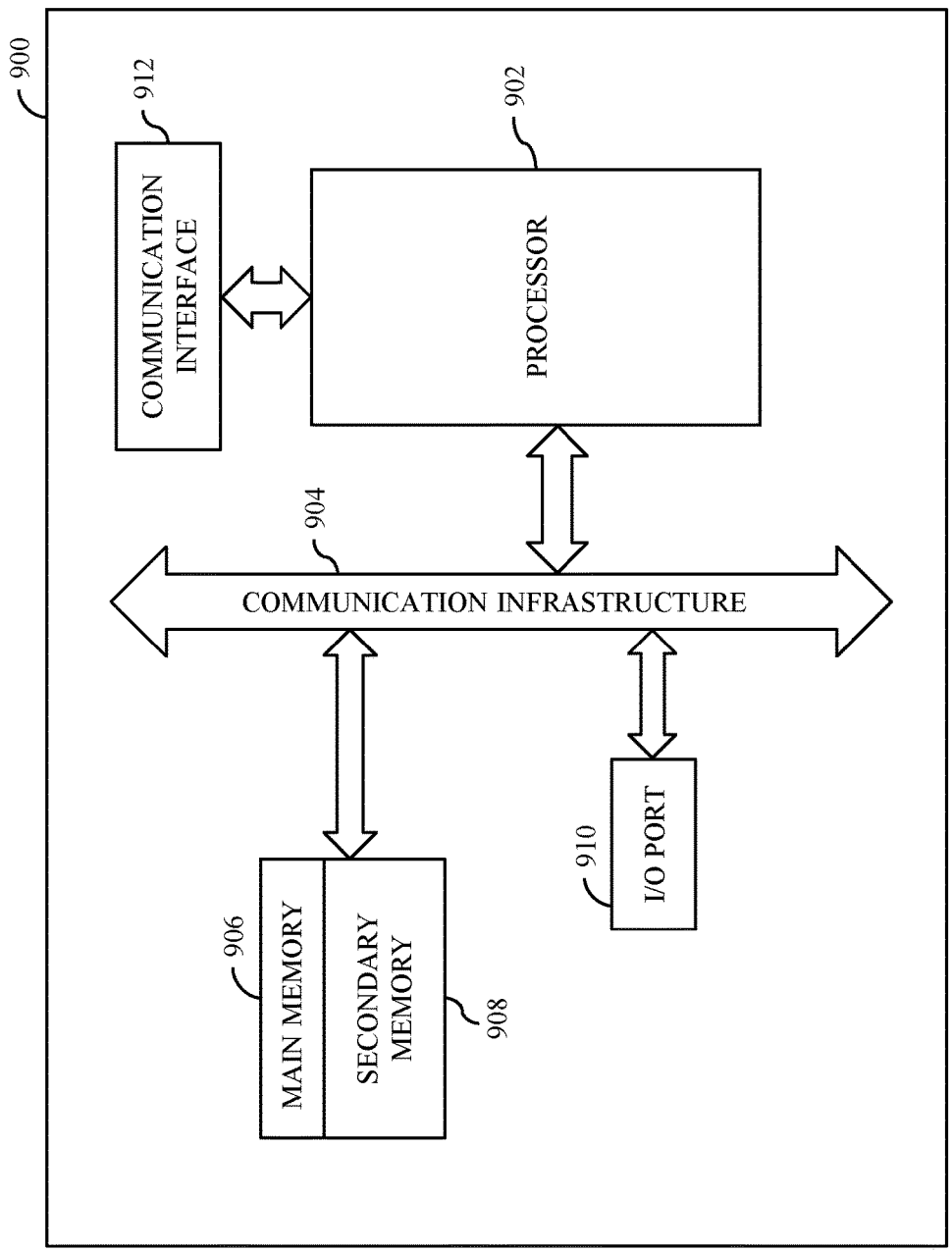
FIG. 9 is a block diagram that illustrates a computer system for calibrating the fixed image-capturing device of the vehicle for predicting the driving lane, in accordance with an exemplary embodiment of the disclosure.

FIG. 9 is a block diagram that illustrates a computer system 900 for calibrating a fixed image-capturing device (such as the image-capturing device 106 or 112) of a vehicle (such as the vehicle 102) and predicting a driving lane (such as the driving lane 506) for the vehicle, in accordance with an exemplary embodiment of the disclosure. An embodiment of the disclosure, or portions thereof, may be implemented as computer readable code on the computer system 900. In one example, the vehicle device 104, the vehicle device 114, the application server 120, and the database server 122 of FIG. 1 may be implemented in the computer system 900 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 6A-6B, 7A-7B, and 8.

The computer system 900 may include a processor 902 that may be a special purpose or a general-purpose processing device. The processor 902 may be a single processor, multiple processors, or combinations thereof. The processor 902 may have one or more processor "cores." Further, the processor 902 may be connected or coupled to a communication infrastructure 904, such as a bus, a bridge, a message queue, multi-core message-passing scheme, the communication network 124, or the like. The computer system 900 may further include a main memory 906 and a secondary memory 908. Examples of the main memory 906 may include RAM, ROM, and the like. The secondary memory 908 may include a hard disk drive or a removable storage drive (not shown), such as a floppy disk drive, a magnetic tape drive, a compact disc, an optical disk drive, a flash memory, or the like. Further, the removable storage drive may read from and/or write to a removable storage device in a manner known in the art. In an embodiment, the removable storage unit may be a non-transitory computer readable recording media.

The computer system 900 may further include an input/output (I/O) port 910 and a communication interface 912. The I/O port 910 may include various input and output devices that are configured to communicate with the processor 902. Examples of the input devices may include a keyboard, a mouse, a joystick, a touchscreen, a microphone, and the like. Examples of the output devices may include a display screen, a speaker, headphones, and the like. The communication interface 912 may be configured to allow data to be transferred between the computer system 900 and various devices that are communicatively coupled to the computer system 900. Examples of the communication interface 912 may include a modem, a network interface, i.e., an Ethernet card, a communication port, and the like. Data transferred via the communication interface 912 may be signals, such as electronic, electromagnetic, optical, or other signals as will be apparent to a person of ordinary skill in the art. The signals may travel via a communications channel, such as the communication network 124, which may be configured to transmit the signals to the various devices that are communicatively coupled to the computer system 900. Examples of the communication channel may include a wired, wireless, and/or optical medium such as cable, fiber optics, a phone line, a cellular phone link, a radio frequency link, and the like. The main memory 906 and the secondary memory 908 may refer to non-transitory computer readable mediums that may provide data that enables the computer system 900 to implement the methods illustrated in FIGS. 6A-6B, 7A-7B, and 8.

Various embodiments of the disclosure provide the vehicle device 104 for calibrating the fixed image-capturing device (such as the image-capturing device 106) of the vehicle 102 and predicting the driving lane 506 for the vehicle 102. The vehicle device 104 may be configured to identify, in the first image 304 including the plurality of lines on the calibration lane of the vehicle 102, the first plurality of rows of pixels corresponding to the plurality of lines perpendicular to the calibration lane. The vehicle device 104 may be further configured to determine, from the first image 304, the first width of the first calibration line corresponding to the first row of pixels of the first plurality of rows of pixels. The vehicle device 104 may be further configured to determine the third width of the third line corresponding to the second row of pixels of the second plurality of rows of pixels in the first image 304. The third width may be determined based on at least the first width and the first angle between the first calibration line and the third line. The first angle may be formed by joining the same endpoints of the first calibration line and the third line. The vehicle device 104 may be further configured to estimate the first column values for each line corresponding to each row of pixels in the first image 304 based on at least one of the first width or the third width associated with the corresponding line. The vehicle device 104 may be further configured to store the first column values for each line in the memory 110. Further, the driving lane 506 for the vehicle 102 may be predicted based on the stored first column values. Further, the first object (such as the object 502b) in the second image 500 may be analyzed for the impending collision with the vehicle 102 when the first object is detected in the driving lane 506 of the vehicle 102.

Various embodiments of the disclosure provide the vehicle device 104 for calibrating the fixed image-capturing device (such as the image-capturing device 106) of the vehicle 102 and predicting the driving lane 506 for the vehicle 102. The vehicle device 104 may be configured to identify, in the first image 402 of the calibration lane of the vehicle 102, the plurality of lines parallel to the calibration lane. The vehicle device 104 may be further configured to determine, for each row of pixels in the first image 402, the observed width between the plurality of lines. The vehicle device 104 may be further configured to estimate, for each row of pixels in the first image 402, the second column values based on the observed width of the corresponding row of pixels, the first vehicle width of the vehicle 102, and the actual lane width between the plurality of lines. The vehicle device 104 may be further configured to store the second column values for each row of pixels in the memory 110. Further, the driving lane 506 for the vehicle 102 may be predicted based on the stored second column values. Further, the first object (such as the object 502*b*) in the second image 500 may be analyzed for the impending collision with the vehicle 102 when the first object is detected in the driving lane 506 of the vehicle 102.

Various embodiments of the disclosure provide the vehicle device 104 for calibrating the fixed image-capturing device (such as the image-capturing device 106) of the vehicle 102 and predicting the driving lane 506 for the vehicle 102. The vehicle device 104 may be configured to identify, from the first image 304 or 402 including at least the calibration lane of the vehicle 102, the plurality of lines. The vehicle device 104 may be further configured to determine the width of each of the plurality of rows of pixels in the first image 304 or 402 based on at least one of the plurality of lines. The vehicle device 104 may be further configured to estimate, for each of the plurality of rows of pixels in the first image 304 or 402, the column values based on at least the first width of the corresponding row of pixels. The vehicle device 104 may be further configured to store the column values for each row of pixels in the memory 110. Further, the driving lane 506 for the vehicle 102 may be predicted based on the stored second column values. Further, the first object (such as the object 502*b*) in the second image 500 may be analyzed for the impending collision with the vehicle 102 when the first object is detected in the driving lane 506 of the vehicle 102.

Various embodiments of the disclosure provide a non-transitory computer readable medium having stored thereon, computer executable instructions, which when executed by a computer, cause the computer to execute operations for calibrating the fixed image-capturing device (such as the image-capturing device 106) of the vehicle 102 and predicting the driving lane 506 for the vehicle 102. The operations include identifying, in the first image 304 including the plurality of lines on the calibration lane of the vehicle 102, the first plurality of rows of pixels corresponding to the plurality of lines perpendicular to the calibration lane. The operations further include determining, from the first image 304, the first width of the first calibration line corresponding to the first row of pixels of the first plurality of rows of pixels. The operations further include determining the third width of the third line corresponding to the second row of pixels of the second plurality of rows of pixels in the first image 304. The third width may be determined based on at least the first width and the first angle between the first calibration line and the third line. The first angle may be formed by joining the same endpoints of the first calibration line and the third line. The operations further include estimating the first column values for each line corresponding to each row of pixels in the first image 304 based on at least one of the first width or the third width associated with the corresponding line. The operations further include storing the first column values for each line in the memory 110. Further, the driving lane 506 for the vehicle 102 may be predicted based on the stored first column values. Further, the first object (such as the object 502*b*) in the second image 500 may be analyzed for the impending collision with the vehicle 102 when the first object is detected in the driving lane 506 of the vehicle 102.

Various embodiments of the disclosure provide a non-transitory computer readable medium having stored thereon, computer executable instructions, which when executed by a computer, cause the computer to execute operations for calibrating the fixed image-capturing device (such as the image-capturing device 106) of the vehicle 102 and predicting the driving lane 506 for the vehicle 102. The operations include identifying, in the first image 402 of the calibration lane of the vehicle 102, the plurality of lines parallel to the calibration lane. The operations further include determining, for each row of pixels in the first image 402, the observed width between the plurality of lines. The operations further include estimating, for each row of pixels in the first image 402, the second column values based on the observed width of the corresponding row of pixels, the first vehicle width of the vehicle 102, and the actual lane width between the plurality of lines. The operations further include storing the second column values for each row of pixels in the memory 110. Further, the driving lane 506 for the vehicle 102 may be predicted based on the stored second column values. Further, the first object (such as the object 502*b*) in the second image 500 may be analyzed for the impending collision with the vehicle 102 when the first object is detected in the driving lane 506 of the vehicle 102.

Various embodiments of the disclosure provide a non-transitory computer readable medium having stored thereon, computer executable instructions, which when executed by a computer, cause the computer to execute operations for calibrating the fixed image-capturing device (such as the image-capturing device 106) of the vehicle 102 and predicting the driving lane 506 for the vehicle 102. The operations include identifying, from the first image 304 or 402 including at least the calibration lane of the vehicle 102, the plurality of lines. The operations further include determining the width of each of the plurality of rows of pixels in the first image 304 or 402 based on at least one of the plurality of lines. The operations further include estimating, for each of the plurality of rows of pixels in the first image 304 or 402, the column values based on at least the first width of the corresponding row of pixels. The operations further include storing the column values for each row of pixels in the memory 110. Further, the driving lane 506 for the vehicle 102 may be predicted based on the stored second column values. Further, the first object (such as the object 502*b*) in the second image 500 may be analyzed for the impending collision with the vehicle 102 when the first object is detected in the driving lane 506 of the vehicle 102.

The disclosed embodiments encompass numerous advantages. The disclosure provides various methods and systems for facilitating the calibration of the fixed image-capturing device of the vehicle 102 to obtain the column values that are utilized in the real-time to predict the driving lane 506 for the vehicle 102. Further, based on at least detection of the first object in the driving lane 506 and the distance of the first object from the vehicle 102, the possibility of the impending collision of the vehicle 102 with the first object may be predicted, and accordingly the warning message may be generated and communicated to the driver of the vehicle 102 for preventing the possible impending collision. Thus, the implementation of the methods and systems of the disclosure may assist the driver during the ongoing trip to avoid accidents based on the detection of various on-road obstacles, such as other vehicles, pedestrians, animals, or the like. The accidents may be avoided by timely communicating and warning the driver of the possible accidents based on at least the distance of the various on-road obstacles from the vehicle 102 and/or the time to collision of the various on-road obstacles with the vehicle 102. By preventing the various on-road collisions, life of personnel travelling with the vehicle 102 may be saved. Further, the vehicle 102 may be prevented from any damage and a maintenance cost associated with the vehicle 102 may be reduced. Thus, the various methods and systems of the disclosure facilitate efficient, effective, and accurate way of predicting the driving lane 506 for the vehicle 102 in the real-time, identifying the various on-road obstacles in the driving lane 506 of the vehicle 102, predicting distances of each on-road obstacle from the vehicle 102, and notifying the driver of the vehicle 102 of the possible impending collision, if any, well in advance.

A person of ordinary skill in the art will appreciate that embodiments and exemplary scenarios of the disclosed subject matter may be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

Techniques consistent with the disclosure provide, among other features, systems and methods for predicting the driving lane (such as the driving lane 506) for the vehicle 102 and detecting the on-road objects (such as the object 502b) in the driving lane. While various exemplary embodiments of the disclosed systems and methods have been described above, it should be understood that they have been presented for purposes of example only, and not limitations. It is not exhaustive and does not limit the disclosure to the precise form disclosed. Modifications and variations are possible in light of the above teachings or may be acquired from practicing of the disclosure, without departing from the breadth or scope.

While various embodiments of the disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method, comprising:
   identifying, by circuitry, in a first image including a plurality of lines on a calibration lane of a first object, a first plurality of rows of pixels corresponding to the plurality of lines perpendicular to the calibration lane;
   determining, by the circuitry, from the first image, a first width of a first line corresponding to a first row of pixels of the first plurality of rows of pixels;
   determining, by the circuitry, a second width of a second line corresponding to a second row of pixels of a second plurality of rows of pixels in the first image based on at least the first width and an angle between the first line and the second line, wherein the angle is formed by joining endpoints of the first line and the second line;
   estimating, by the circuitry, column values for each line corresponding to each row of pixels in the first image based on at least one of the first width or the second width associated with a corresponding line; and
   storing, by the circuitry in a memory, the estimated column values for each line, wherein a driving lane for the first object is predicted based on the stored column values, and wherein a second object in a second image is analyzed for impending collision with the first object when the second object is detected in the driving lane of the first object.

2. The method of claim 1, further comprising:
   converting, by the circuitry, the first image from a first color model to a second color model; and
   filtering, by the circuitry, the converted first image to obtain a filtered first image including a predetermined color,
   wherein the plurality of lines is identified from the first image by executing edge detection of the filtered first image.

3. The method of claim 2, wherein the first and second color models are at least one of a black and white color model, a greyscale color model, a red, green, and blue (RGB) color model, a hue, saturation, and value (HSV) color model, a cyan, magenta, yellow, and black (CMYK) color model, a hue, saturation, and brightness (HSB) color model, a hue, saturation, and lightness (HSL) color model, or a hue, chroma, and value (HCV) color model, and wherein the first color model is different from the second color model.

4. The method of claim 1, wherein the first image comprises the first and second pluralities of rows of pixels.

5. The method of claim 1, further comprising:
   detecting, by the circuitry, a bottom edge, a first side edge, a second side edge, and a top edge of the second object in the second image;
   generating, by the circuitry, a bounding box including the second object based on the bottom edge, the first side edge, the second side edge, and the top edge; and
   estimating, by the circuitry, an overlapping area between the bounding box and the driving lane, wherein the second object is detected for the impending collision when the overlapping area is greater than or equal to a threshold area.

6. The method of claim 5, further comprising:
   generating, by the circuitry, a warning message based on at least a distance of the second object from the first object, when the overlapping area is greater than or equal to the threshold area; and
   communicating, by the circuitry to an entity associated with the first object, the warning message indicating the impending collision.

7. The method of claim 1, wherein the first image and the second image are captured by an image-capturing device that is mounted at a center of the first object such that the first image and the second image are equally divided into two halves along an axis passing via the image-capturing device, and wherein the first image and the second image include an equal number of row pixels and column pixels.

8. The method of claim 7, wherein the first width and the second width are determined in terms of number of column pixels in the first image.

9. A method, comprising:
identifying, by circuitry, in a first image of a calibration lane of a first object, a plurality of lines parallel to the calibration lane;
determining, by the circuitry, for each row of pixels in the first image, an observed width between the plurality of lines;
estimating, by the circuitry, for each row of pixels in the first image, column values based on the observed width of a corresponding row of pixels, a first object width of the first object, and an actual lane width between the plurality of lines; and
storing, by the circuitry in a memory, the estimated column values for each row of pixels, wherein a driving lane for the first object is predicted based on the stored column values, and wherein a second object in a second image is analyzed for impending collision with the first object when the second object is detected in the driving lane of the first object.

10. The method of claim 9, further comprising:
converting, by the circuitry, the first image from a first color model to a second color model; and
filtering, by the circuitry, the converted first image to obtain a filtered first image including a predetermined color,
wherein the plurality of lines is identified from the first image by executing edge detection of the filtered first image.

11. The method of claim 10, wherein the first and second color models are at least one of a black and white color model, a greyscale color model, a red, green, and blue (RGB) color model, a hue, saturation, and value (HSV) color model, a cyan, magenta, yellow, and black (CMYK) color model, a hue, saturation, and brightness (HSB) color model, a hue, saturation, and lightness (HSL) color model, or a hue, chroma, and value (HCV) color model, and wherein the first color model is different from the second color model.

12. The method of claim 9, further comprising:
detecting, by the circuitry, a bottom edge, a first side edge, a second side edge, and a top edge of the second object in the second image;
generating, by the circuitry, a bounding box including the second object based on the bottom edge, the first side edge, the second side edge, and the top edge; and
estimating, by the circuitry, an overlapping area between the bounding box and the driving lane, wherein the second object is detected for the impending collision when the overlapping area is greater than or equal to a threshold area.

13. The method of claim 12, further comprising:
generating, by the circuitry, a warning message based on at least a distance of the second object from the first object, when the overlapping area is greater than or equal to the threshold area; and
communicating, by the circuitry to an entity associated with the first object, the warning message indicating the impending collision.

14. The method of claim 9, wherein the first image and the second image are captured by an image-capturing device that is mounted at a center of the first object such that the first image and the second image are equally divided into two halves along an axis passing via the image-capturing device.

15. The method of claim 14, wherein the first image and the second image include an equal number of row pixels and column pixels, and wherein the observed width is determined in terms of the number of column pixels in the first image.

16. A system, comprising:
circuitry configured to:
identify, in a first image of a calibration lane of a first object, a plurality of lines parallel to the calibration lane;
determine, for each row of pixels in the first image, an observed width between the plurality of lines;
estimate, for each row of pixels in the first image, column values based on the observed width of a corresponding row of pixels, a first object width of the first object, and an actual lane width between the plurality of lines; and
store the estimated column values for each row of pixels in a memory, wherein a driving lane for the first object is predicted based on the stored column values, and wherein a second object in a second image is analyzed for impending collision with the first object when the second object is detected in the driving lane of the first object.

17. The system of claim 16, wherein the circuitry is further configured to:
convert the first image from a first color model to a second color model; and
filter the converted first image to obtain a filtered first image that includes a predetermined color,
wherein the plurality of lines is identified from the first image based on execution of edge detection of the filtered first image.

18. The system of claim 16, wherein the circuitry is further configured to:
detect a bottom edge, a first side edge, a second side edge, and a top edge of the second object in the second image;
generate a bounding box that includes the second object based on the bottom edge, the first side edge, the second side edge, and the top edge; and
estimate an overlapping area between the bounding box and the driving lane, wherein the second object is detected for the impending collision when the overlapping area is greater than or equal to a threshold area.

19. The system of claim 18, wherein the circuitry is further configured to:
generate a warning message based on at least a distance of the second object from the first object, when the overlapping area is greater than or equal to the threshold area; and
communicate the warning message to an entity associated with the first object, wherein the warning message indicates the impending collision.

20. The system of claim 16, wherein the first image and the second image are captured by an image-capturing device that is mounted at a center of the first object such that the first image and the second image are equally divided into two halves along an axis that passes via the image-capturing device, and wherein the first image and the second image include an equal number of row pixels and column pixels, and wherein the observed width is determined in terms of the number of column pixels in the first image.

\* \* \* \* \*